(12) United States Patent
Niamut et al.

(10) Patent No.: US 10,958,942 B2
(45) Date of Patent: Mar. 23, 2021

(54) PROCESSING SPHERICAL VIDEO DATA

(71) Applicants: Koninklijke KPN N.V., Rotterdam (NL); Nederlandse Organisatie voor Toegepast-Natuurwetenschappelijk Onderzoek TNO, The Hague (NL)

(72) Inventors: Omar Aziz Niamut, Vlaardingen (NL); Emmanuel Thomas, Delft (NL)

(73) Assignees: Koninklijke KPN N.V., Rotterdam (NL); Nederlandse Organisatie Voor Toegepast-Natuurwetenschappelijk Onderzoek TNO, The Hague (NL)

( * ) Notice: Subject to any disclaimer, the term of this patent is extended or adjusted under 35 U.S.C. 154(b) by 0 days.

(21) Appl. No.: 16/486,008

(22) PCT Filed: Feb. 27, 2018

(86) PCT No.: PCT/EP2018/054740
§ 371 (c)(1),
(2) Date: Aug. 14, 2019

(87) PCT Pub. No.: WO2018/154130
PCT Pub. Date: Aug. 30, 2018

(65) Prior Publication Data
US 2020/0053393 A1   Feb. 13, 2020

(30) Foreign Application Priority Data

Feb. 27, 2017  (EP) .................................. 17158067

(51) Int. Cl.
*H04N 19/91* (2014.01)
*H04N 19/176* (2014.01)
(Continued)

(52) U.S. Cl.
CPC ................ *H04N 19/91* (2014.11); *G06T 7/11* (2017.01); *G06T 7/13* (2017.01); *G06T 7/90* (2017.01);
(Continued)

(58) Field of Classification Search
None
See application file for complete search history.

(56) References Cited

U.S. PATENT DOCUMENTS

2016/0112489 A1   4/2016  Adams et al.

FOREIGN PATENT DOCUMENTS

WO   2016048015 A1   3/2016
WO   2016076680 A1   5/2016

OTHER PUBLICATIONS

PCT International Search Report and Written Opinion, PCT International Application No. PCT/EP2018/054740, dated Apr. 20, 2018, 12 pages.

(Continued)

*Primary Examiner* — Christopher Braniff
(74) *Attorney, Agent, or Firm* — McDonnell Boehnen Hulbert & Berghoff LLP

(57) ABSTRACT

A method for processing spherical video data is described including a data processor providing spherical video data in the form of projected video frames to an input of an encoder process, a projected video frame including one or more pixel regions, the one or more pixel regions representing pixels of spherical video data projected onto one or more 2D projection surfaces of a projection model, preferably an equirectangular or a 3D polyhedron projection model, for projecting spherical video data onto a rectangular 2D surface of a video frame; wherein the providing of spherical video data may comprise: generating a set of modified projected video frames on the basis of a projected video frame, the gener- (Continued)

ating including applying different shift and/or rotation operations to pixels, preferably one or more pixel regions, of the selected projected video frame; applying an image analysis algorithm to the modified projected video frames, the image analysis algorithm determining an image analysis parameter for a least part of the modified projected video frames, the image analysis parameter being indicative for the encoding efficiency and/or image quality; and, selecting a modified projected video frame from the set of modified projected video frames, the selected modified projected video frame being associated with an image analysis parameter indicative of the best encoding efficiency and/or image quality.

29 Claims, 13 Drawing Sheets

(51) Int. Cl.
    H04N 19/182    (2014.01)
    H04N 5/232     (2006.01)
    G06T 7/11      (2017.01)
    G06T 7/13      (2017.01)
    G06T 7/90      (2017.01)
(52) U.S. Cl.
    CPC ......... H04N 19/176 (2014.11); H04N 19/182 (2014.11)

(56) References Cited

OTHER PUBLICATIONS

Hannuksela, Miska M. et al., "OMAF Architecture", International Organisation for Standardisation Organisation Internationale De Normalisation, ISO/IEC JTC1/SC29/WG11 Coding of Moving Pictures and Audio, MPEG Meeting, Oct. 2016, 6 pages.
Oh, Sejin et al., "SEI Message for Signaling of 360-Degree Video Information", Joint Collaborative Team on Video Coding (JCT-VC) of ITU-T SG 16 WP 3 and ISO/IEC JTC 1/SC 29/WG 11, JCT-VC Meeting, Jan. 12-20, 2017, 6 pages.
Choi, Byeongdoo et al., "Text of ISO/IEC 23000-20 CD Omnidirectional Media Application Format", International Organisation for Standardisation Organisation Internationale De Normalisation, ISO/IEC JTC1/SC29/WG11 Coding of Moving Pictures and Audio, MPEG Meeting, Jan. 2017, 51 pages.
Lai, Polin, "OMAF Pack-VE Report", International Organisation for Standardisation Organisation Internationale De Normalisation, ISO/IEC JTC1/SC29/WG11 Coding of Moving Pictures and Audio, MPEG Meeting, Jan. 2017, 48 pages.
Yip, Eric et al., "Technologies Under Consideration for ISO/IEC 23000-20 Omnidirectional Media Application Format", International Organisation for Standardisation Organisation Internationale De Normalisation, ISO/IEC JTC1/SC29/WG11 Coding of Moving Pictures and Audio, MPEG Meeting, Jan. 2017, 50 pages.
European Search Report, European Patent Application No. 17158067.3, dated Aug. 11, 2017, 10 pages.
European Search Report, European Patent Application No. 17170049.5, dated Feb. 8, 2018, 15 pages.
PCT International Search Report and Written Opinion, PCT International Application No. PCT/EP2018/061817, dated Sep. 21, 2018, 21 pages.
Choi, Byeongdoo et al., "Text of ISO/IEC 23000-20 CD Omnidirectional Media Application Format", International Organisation for Standardisation, Organisation Internationale De Normalisation, ISO/IEC JTC1/SC29/WG11, Coding of Moving Pictures and Audio, Jan. 2017, 49 pages.
Hannuksela, Miska M., et al., "OMAF Pack-VE: Rectangular Region-Wise Packing for ISOBMFF", International Drganisation for Standardisation, Organisation Internationale De Normalisation, ISO/IEC JTC1/SC29/WG11, Coding of Moving Pictures and Audio, Jan. 2017, 4 pages.
Hannuksela, Miska M. et al., "Virtual Reality Video Metadata in ISO Base Media File Format", International Organisation for Standardisation, Organisation Internationale De Normalisation, ISO/IEC JTC1/SC29/WG11, Coding of Moving Pictures and Audio, Oct. 2016, 8 pages.
Woo, Jihwan et al., "OMAF Pack-CE: Generalized Region-Wise Packing", International Organisation for Standardisation, Organisation Internationale De Normalisation, ISO/IEC JTC1/SC29/WG11, Coding of Moving Pictures and Audio, Apr. 2017, 13 pages.
Kammachi-Sreedhar, K. et al., "OMAF PROJ-VE/PACK-VE: Test Results fro Viewport-Dependent Pyramid, Cube Map, and Equirectangular Panorama Schemes", International Organisation for Standardisation, Organisation Internationale De Normalisation, ISO/IEC JTC1/SC29/WG11, Coding of Moving Pictures and Audio, Jan. 2017, 9 pages.
Lai, PoLin et al., "CICP VR Projection and Packing Indicator", International Organisation for Standardisation, Organisation Internationale De Normalisation, ISO/IEC JTC1/SC29/WG11, Coding of Moving Pictures and Audio, Oct. 2016, 6 pages.
Byeongdoo Choi et al., "Text of ISO/IEC DIS 23090-2 Omnidirectional Media Format" 2017, 118 MPEG Meeting Hobert AU Apr. 6, 2017.docx STD Version 2.2; equivalent to Deshpande (Sharp) S et al: "Text of ISO/IEC 23000-20 CD Omnidirectional Media Application Format", 118 MPEG Meeting Hobart AU, Apr. 6, 2017.
International Telecommunication Union, ITU-T Telecommunication Standardization Sector of ITU, Series H: Audiovisual and Multimedia Systems Infrastructure of audiovisual services—Coding of moving video, High efficiency video coding, H.265, Apr. 2015.
Headjack, The XR Support Wizards Have Entered the Building, Best in Class-Documentation, Jul. 3, 2020, 22 pages.
Facebook Engineering Article, posted Oct. 15, 2015.
Abbas, Adeel, GoPro test sequences for Virtual Reality video coding, Joint Video Exploration Team (JVET) of ITU-T SG 16 WP 3 and ISO/IEC JTC 1/SC 29/WG 11, 3rd Meeting: Geneva, CH, May 26-31, 2016.
Jill Boyce, Qian Xu, "AHG8: Spherical rotation orientation SEI for coding of 360 video," JVET-E0075_v2, Joint Video Exploration Team (JVET) of ITU-T SG 16 WP 3 and ISO/IEC JTC 1/SC 29/WG 11, 5th Meeting: Geneva, CH, Jan. 12-20, 2017.

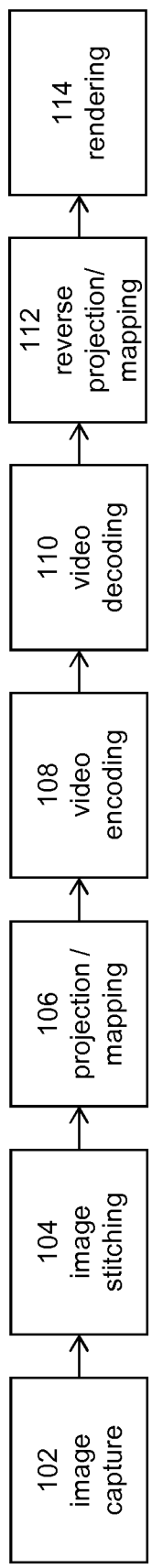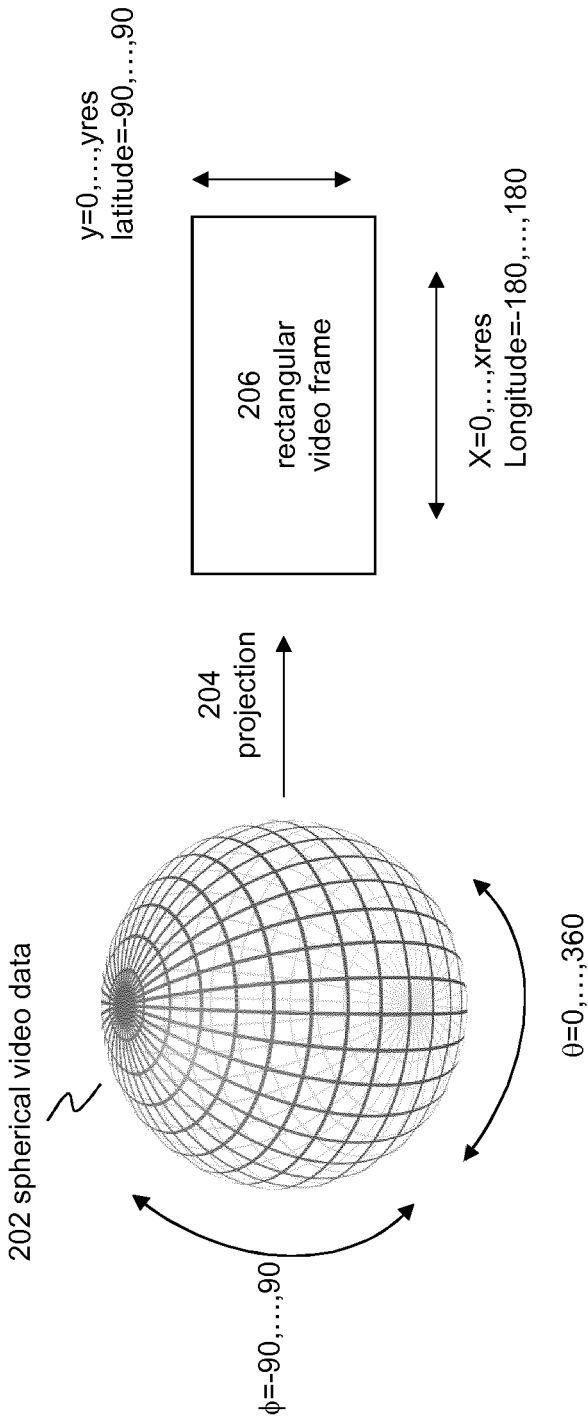

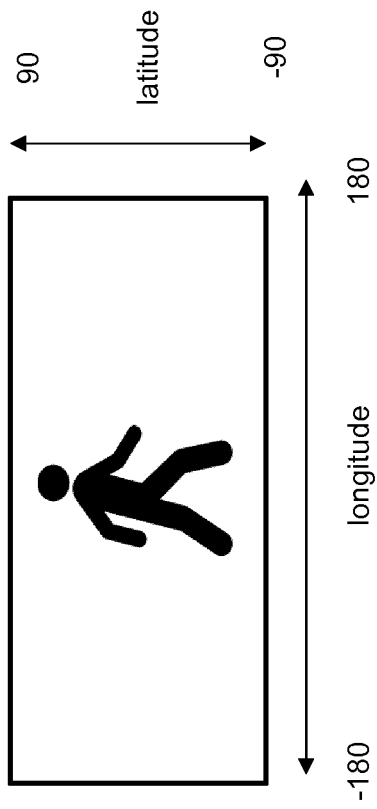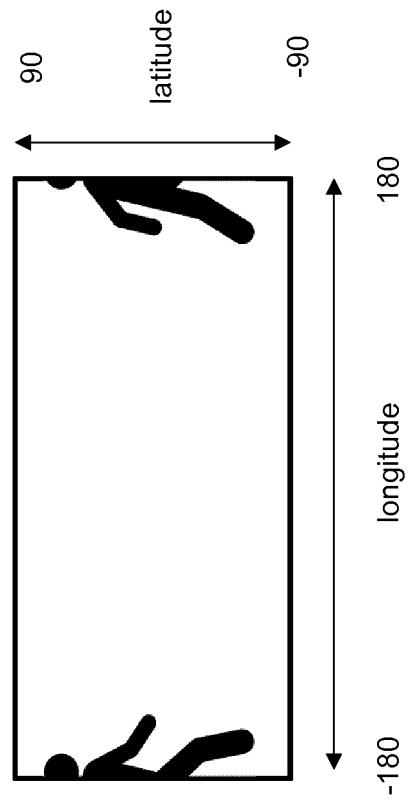
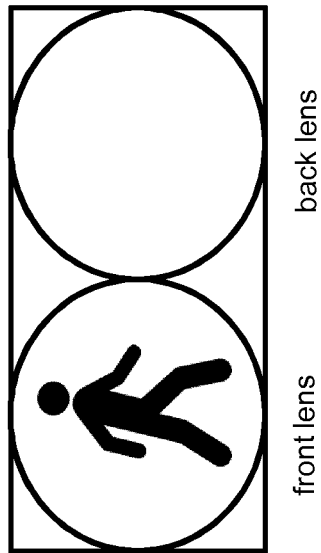
FIG. 5A
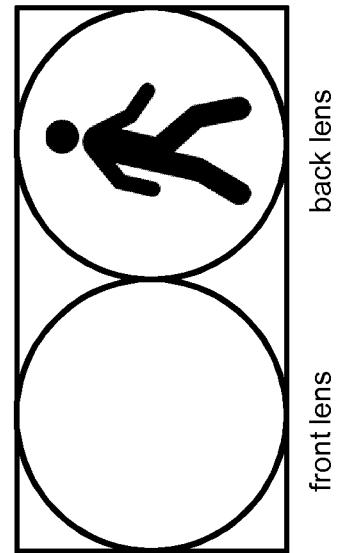
FIG. 5B

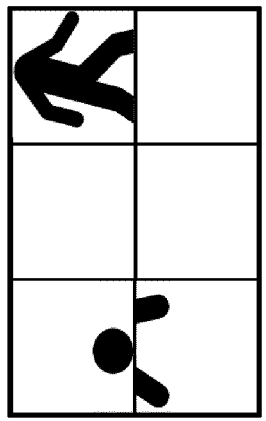 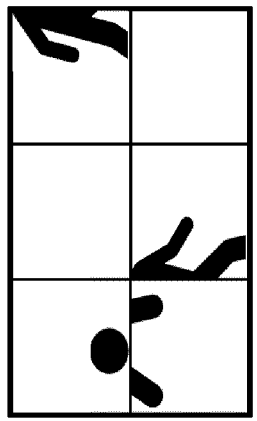 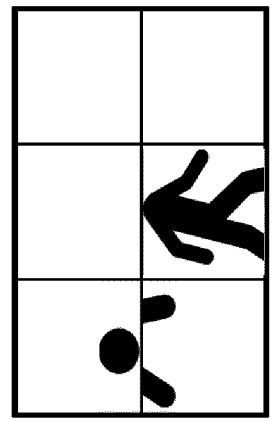
  
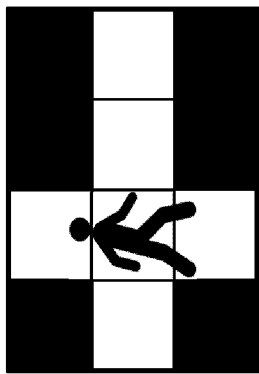 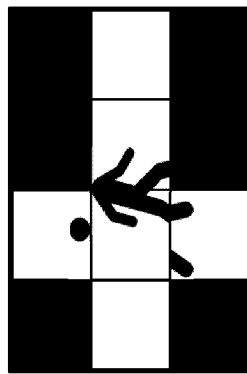 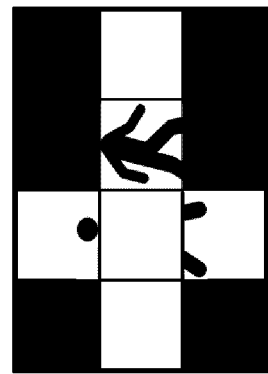
FIG. 6A   FIG. 6B   FIG. 6C

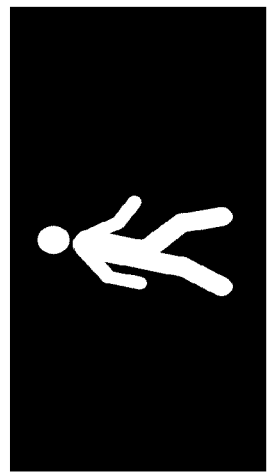
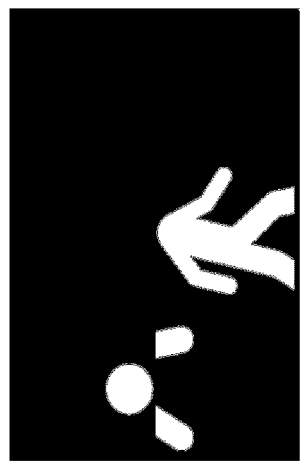
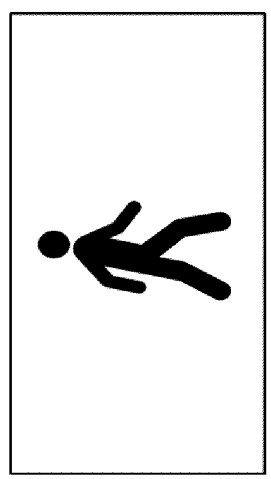
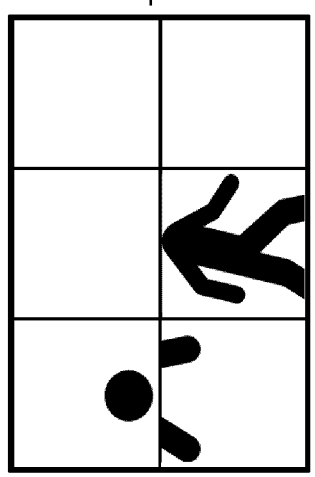
FIG. 10A
FIG. 10B

PROCESSING SPHERICAL VIDEO DATA

CROSS REFERENCE TO RELATED APPLICATIONS

The present application is a national stage entry of, and claims priority to, PCT/EP2018/054740, filed on Feb. 27, 2018, which claims priority to European Patent Application EP 17158067.3, filed in the European Patent Office on Feb. 27, 2017, both of which are hereby incorporated in their entirety herein by reference.

FIELD OF THE INVENTION

The invention relates to processing spherical video data, and, in particular, though not exclusively, to methods and systems for processing spherical video data, a decoder apparatus for decoding encoded spherical video data and an encoder apparatus for encoding spherical video data and a computer program product for executing such methods.

BACKGROUND OF THE INVENTION

Currently an increasingly number of professional and consumer-grade cameras are able to produce 360-degree or omnidirectional video content. This content, which can be regarded as pixels arranged on a spherical surface, is hereafter referred to in short as spherical video content. The delivery of spherical video content usually requires a higher bandwidth than conventional videos. Spherical video content represents a wider field of view than conventional videos and thus contains more information from the original scene than conventional video. Typically, however only a portion of the spherical video content is displayed to the user. This portion is typically referred to as viewport which is characterised by the Field of View (FoV), i.e. the (vertical, horizontal or diagonal) angular extent of a given visual scene that is displayed to the user, and depends on the direction the user is watching. Pixels arranged on a spherical surface however cannot be handled directly by current video coding systems which are configured to process standardized video data formats referred to as video frames, i.e. rectangular arrangements of pixels. For that reason, spherical video content is processed before it is fed to the input of an encoding device.

A typical processing chain for spherical video content may include capturing of panoramic images with a panoramic or 360-degree image capturing systems which typically include multiple image sensors (e.g. CMOS or CCD censors), then stitching separate images from the individual image sensors together in an image stitching operation into spherical video data that forms the spherical video content, and forming 2D rectangular image frames on the basis of spherical image data which are subsequently encoded by an encoding device (an encoder). The encoded spherical video data may be provided to (e.g. transmitted to) media playback devices and displayed using e.g. Head Mounted Displays (HMDs) or on other displays. The media playback devices are configured to decode and render the encoded spherical video data, usually based on sensor information measuring user movements (e.g. viewpoint direction), or based on other user input (e.g. joystick, keyboard, touchscreen).

The formation of 2D rectangular image frames on the basis of spherical video data into may typically include a projection of the spherical video data onto the surfaces of a geometrical object (an object having straight edges) and mapping of the projected surfaces onto a rectangular shape.

For encoding spherical video content, a 2D rectangular video frame is the most convenient form for use as input to the encoder, as it does not require modifications to existing encoding systems. Different projection models, such as an equirectangular projection (ERP), cube or pyramid projection model exist. In case of ERP in which a sphere is projected onto a rectangle using the polar angles as the horizontal and vertical coordinates projection and mapping are realized in one step. In this case, the mapping is incorporated in the projection step as the EPR projection directly results into a rectangular shape. Both the equirectangular and other projection formats can be fed directly into existing encoding schemes, such as H.264/AVC and HEVC.

A problem with the known transformations of spherical video data into 2D (e.g. rectangular) video frames is that these transformations introduce pixel regions in the 2D frame due to the fact that the spherical video is projected onto one or more 2D planes. The combined step of projecting a sphere onto the 2D faces of a 3D (polyhedronic) object, e.g. a cube, and mapping the faces onto a 2D rectangle, results in an arrangement of neighbouring pixels regions wherein the boundaries of these pixel regions may form artificial and sometimes discontinuous pixel boundaries. These boundaries, which hereafter may be referred to as region boundaries, are artificial in that they do not represent an actual, physical boundary in the captured scene. As a result, one or more region boundaries are created in the 2D video frame that is provided to the input of an encoder. In the prior art, object movements and/or areas with high information density (e.g. areas comprising a large number of details and/or edges) in a scene of spherical content may be traversed (e.g. dissected) by these region boundaries, due to the fact that the projection steps are preconfigured and indiscriminate of the video content itself. This way, a natural phenomenon in the real-world scene may thus lead to a significant, artificially created motion in different and discontinuous areas of the 2D rectangular video frames.

When encoding video frames comprising such region boundaries using a state-of-the art encoding scheme, such as H.264/AVC or HEVC, the region boundaries may thus lead to reduced coding performance; i.e. a higher visual impairment at a given target bit rate, or a higher bit rate for a target visual quality. Region boundaries may interfere with existing features of a state of the art coding system such as inter-frame prediction and motion compensation and spatial intra-frame prediction.

For example, region boundaries may increase the entropy in the motion vectors and reduce the compression gain. In most extreme cases, the motion vectors are restricted to a certain area of the frame. In that case, no motion vector will be use to predict between two video frames an object going from one frame edge to another, hence decreasing the ability of the encoder to efficiently compress the video sequence.

Additionally, when objects that are imaged in a picture cross region boundaries, there is an increased risk that an encoder uses different encoding strategies for pixels associated with the different pixel regions. This way, one part of an object in a first pixel region may be encoded with a coding strategy that is different from the other part of the object that is located in another pixel region that neighbours the first pixel region. For example, an encoder may use different prediction parameters to predict pixels associated with the different pixel regions in a single frame.

After decoding the encoded data into 2D rectangular frames, the playout device renders a spherical surface and textures the spherical surface with the video frames. The different encoding strategies may cause differences in quality, which may be become visible in the rendered video images as one or more artifacts, e.g. as a thin line or the like, and thus degrading the visual quality of the rendered content.

Hence, from the above it follows there is a need in the art for improved methods and systems for processing of spherical video data. In particular, there is a need in the art for methods and systems that are able to process spherical video data such that detrimental effects of the transformation of the spherical video data in a rectangular video frame is reduced such that the encoding efficiently increased and that the visual quality of the rendered content is improved.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the users computer, as a stand-alone software package, partly on the users computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Projected video frames, resulting from projecting spherical video data onto a rectangular video frame using a projection model, comprises pixel regions. These pixels regions have the same shape as the 2D projection faces of the projection model that was used (e.g. square pixel regions matching the square projection faces of a cube projection mode). The pixel regions are arranged (e.g. via a packing operation) to form a rectangular video frame wherein neighbouring pixel regions in the video frame may form the region boundaries. These region boundaries may lead to reduced coding performance and degradation in the visual quality of the rendered content.

The invention proposes schemes for processing the spherical video data in the uncompressed or decoded domain in order to achieved improved coding efficiency and reduction of detrimental effects in the visual quality of the rendered content due to the region boundaries. The improvements are achieved by shifting and/or rotating one or more pixel regions in projected video frames before encoding and after decoding, in order to avoid significant object movement and/or pixel areas of high information density (for example areas having high variations in e.g. color, contrast, edges, etc.) crossing region boundaries.

In an aspect, the invention may relate to a method of processing spherical video data comprising: a data processor processing a projected video frame for input to an encoding process, a projected video frame including one or more pixel regions, the one or more pixel regions representing pixels of spherical video data projected onto one or more 2D projection surfaces of a projection model, preferably an equirectangular or a 3D polyhedron projection model; wherein the processing may include: generating a plurality of different modified projected video frames on the basis of the projected video frame, the generating including applying each time different one or more pixel region shift and/or pixel region rotation operations, to one or more pixels regions of the projected video frame; applying an image analysis algorithm to each one of the plurality of modified projected video frames, the image analysis algorithm determining an image analysis parameter for each modified projected video frame, the image analysis parameter being predictive of a level of encoding efficiency associated with encoding a modified projected video frame, and/or the image analysis parameter being indicative of an image quality of a modified projected video frame; selecting from said plurality, for input to the encoding process, a modified projected video frame associated with an image analysis parameter being predictive of the highest level of encoding efficiency, and/or associated with an image analysis parameter being indicative of the highest image quality; the selected modified projected video frame being associated with a selected one or more pixel region shift and/or pixel region rotation operations; and, determining rendering information for a data processor of a video rendering apparatus, the rendering information including information for, preferably as a post-decoding operation, reversing the selected one or more pixel shift and/or pixel rotation operations.

Hence, the content in a projected video frame is pre-processed before encoding such that a higher coding efficiency and/or a higher visual quality can be achieved. The pre-processing includes the application of different modifications, i.e. pixel region shift and/or pixel region rotation operations, to a projected video frame and select from these different modified projected video frame a modified projected video frame which is predictive for the highest video encoding efficiency and/or indicative of the highest visual video quality. In order to select this modified projected video frame an image analysis algorithm may be applied to different generated modified projected video frames so that an image analysis parameter for each of the modified projected video frames can be generated. The image analysis parameter is selected to correlate with a predictive encoding efficiency and/or an indicative image quality of a particular projected video frame. Modified projected video frames with image analysis parameter that predicts the best encoding efficiency and/or indicates the highest image quality may be selected for input to an encoder apparatus. This optimization process may be performed in the decoded and uncompressed (e.g. raw image format) domain, e.g. as a data processing step before encoding, such that the invention does not dependent on the codec that is used for encoding and decoding of the spherical video data.

In an embodiment, one or more boundaries of the one or more pixel regions form one or more region boundaries in a projected video frame, the image analysis algorithm being adapted to analyse pixels, preferably blocks of pixels, located at one or more region boundaries of the modified projected image frames or located in one or more predetermined areas around the one or more region boundaries of the modified projected image frames, whereby the one or more region boundaries of the projected video frame and the one or more region boundaries of the modified projected video frames preferably have a corresponding position. The position of the region boundaries for a certain projection model in a projected video frame are known. In embodiments of the invention, the position of these boundaries in a frame remains unchanged (and may then be considered static or fixed for a given projection) during pixel region shift and/or pixel region rotation operations. Pixel values of pixels on both on both sides of such a boundary may however change as a result of the one or more operations. Hence, the analysis algorithm may take the position of these boundaries into account when determining an image analysis parameter. For example, the algorithm may select pixel areas at pixel boundaries formed by neighbouring pixel regions and perform the image analysis on these pixel areas. This way, image process parameters may be determined in a very efficient way.

In an embodiment, the rendering information may comprise information about the one or more selected shift and/or rotation operations; or, information about one or more shift and/or rotation operations adapted to reverse the one or more selected pixel shifts and/or pixel rotations.

In an embodiment, the projection model may be an equirectangular projection model or a 3D polyhedron projection model or a combination thereof.

In an embodiment, the image analysis algorithm may determine the presence of one or more discontinuities in one or more objects at region boundaries. In an embodiment, the one or more discontinuities in the one or more objects at region boundaries may coincide with the region boundaries. The image analysis algorithm may determine a measure for (an amount of) pixel discontinuities at the region borders. A modified projected video frame with minimal discontinuities at the region borders may be selected as the optimized projected video frame as a large amount of areas of discontinuities at the region decreases the coding efficiency.

In an embodiment, the image analysis algorithm may determine one or more areas of high saliency in a projected video frame and determining if the one or more areas of high saliency cross one or more region boundaries.

In an embodiment, the image analysis algorithm may determine a number of areas in a projected video frame on the basis of at least one of: an entropy analysis, a saliency analysis, a colour shift analysis, a motion magnitude and/or a motion direction analysis, an object analysis, a colour shift analysis algorithm, a boundary analysis algorithm, an edge detection analysis algorithm.

In an embodiment, the image analysis algorithm may be performed over multiple, e.g. a sequence of projected video frames. For example, in an embodiment, the image analysis algorithm may use a sequence of projected video frames in order to determine one or more moving objects in these frames and to determine if the one or more objects cross or going to cross one or more region boundaries.

In an embodiment, the pixel region shift may represent a rotation of the spherical video data. In an embodiment, the rotation may be defined as a rotation vector.

In an embodiment, the shape of the one or more pixel regions in a projected video frame may match the shape of the one or more 2D projection surfaces of the projection model.

In an embodiment, the pixel region shift and/or pixel region rotation operations include: shifting pixels in one or more pixel regions of the projected video frame from a first pixel position to a second pixel position; and/or, rearranging positions of pixel regions in the projected video frame; and/or, exchanging pixels of a first pixel region at a first position in a projected video frame with the pixels of a second pixel region at a second position in the projected video frame; and/or, rotating the pixels of one or more pixel regions in the projected video frame.

In an embodiment, the method may further comprise: providing the selected modified projected video frame to the input of the encoder process.

In another embodiment, the method may further comprises: generating a sequence of modified video frames by applying the selected one or more pixel region shift and/or pixel region rotation operations to a sequence of projected video frames; and, providing the generated sequence of modified projected video frames to the input of the encoder process.

In an embodiment, the method may comprise: an encoder apparatus associated with the data processor encoding the video data of the one or more modified projected video frames and storing the encoded video data, and optionally, the rendering information in one or more data containers.

In an embodiment, a data container may be an ISOBMFF type data container. In an embodiment, the data may be stored as one or more segment files for sending the encoded video data on the basis of a HTTP adaptive streaming (HAS) protocol, to a HAS client apparatus. In an embodiment, the HAS protocol may be an MPEG DASH streaming protocol or a derivative thereof.

In an embodiment, the rendering information may be stored in a box of an ISOBMFF type data container, preferably in a box inside a Sample Table Box ('stbl') of the ISOBMFF type data container.

In an embodiment, the encoded video data of the one or more modified projected video frames may be stored as a video track in the data container and rendering information may be stored as a metadata track in the data container, wherein the metadata track may be linked to the video data track.

In an embodiment, the rendering information may comprise at least one of: one or more pixel region identifiers for identifying one or more pixel regions in a projected video frame; location information of the one or more pixel regions identified by said one or more pixel region identifiers, the location information signaling the data processor the position of the one or more pixel regions in the projected video frame.

In an embodiment, the video data of the one or more modified projected video frames may be encoded by the encoder process into a bitstream.

In an embodiment, during the encoding the rendering information is inserted as one or more SEI messages in the bitstream.

In a further aspect, the invention may relate to a method of processing spherical video data comprising: a data processor processing projected video frames for a rendering apparatus, a projected video frame including one or more pixel regions, the one or more pixel regions representing pixels of spherical video data projected onto one or more 2D projection surfaces of a projection model, preferably an equirectangular or a 3D polyhedron projection model; the processing including: the data processor receiving one or more projected video frames from a decoding apparatus; the data processor receiving rendering information associated with the one or more received projected video frames, the rendering information including information for reversing one or more pixel shifts and/or pixel rotation operations that were applied to pixels of the one or more received projected video frames before encoding; and, the data processor using the rendering information to reverse the one or more pixel region shift and/or pixel region rotation operations that were applied to pixels of one or more pixel regions of the one or more received projected video frames before encoding.

In another aspect, the invention may relate to a data processing apparatus, preferably for a video encoding apparatus, comprising: a computer readable storage medium having at least part of a program embodied therewith; and, a computer readable storage medium having computer readable program code embodied therewith, and a processor, preferably a microprocessor, coupled to the computer readable storage medium, wherein responsive to executing the computer readable program code, the processor is configured to perform executable operations comprising: processing a projected video frame for input to an encoding process, a projected video frame including one or more pixel regions, the one or more pixel regions representing pixels of spherical video data projected onto one or more 2D projection surfaces of a projection model, preferably an equirectangular or a 3D polyhedron projection model; the processing including: generating a plurality of different modified projected video frames on the basis of the projected video frame, the generating including applying each time different one or more pixel region shift and/or pixel region rotation operations, to one or more pixels regions of the projected video frame; applying an image analysis algorithm to each one of the plurality of modified projected video frames, the image analysis algorithm determining an image analysis parameter for each modified projected video frame, the image analysis parameter being predictive of a level of encoding efficiency associated with encoding a modified projected video frame, and/or the image analysis parameter being indicative of an image quality of a modified projected video frame; selecting from said plurality, for input to the encoding process, a modified projected video frame associated with an image analysis parameter being predictive of the highest level of encoding efficiency, and/or associated with an image analysis parameter being indicative of the highest image quality; the selected modified projected video frame being associated with a selected one or more pixel region shift and/or pixel region rotation operations; determining rendering information for use by a data processor of a video rendering apparatus, the rendering information including information for, preferably as a post-decoding operation, reversing the selected one or more pixel shift and/or pixel rotation operations.

In yet another aspect, the invention relates to a processing apparatus for a video rendering apparatus comprising: a computer readable storage medium having at least part of a program embodied therewith; and, a computer readable storage medium having computer readable program code embodied therewith, and a processor, preferably a microprocessor, coupled to the computer readable storage medium, wherein responsive to executing the computer readable program code, the processor is configured to perform executable operations comprising: processing projected video frames, a projected video frame including one or more pixel regions, the one or more pixel regions representing pixels of spherical video data projected onto one or more 2D projection surfaces of a projection model, preferably an equirectangular or a 3D polyhedron projection model; the processing including: receiving one or more projected video frames from a decoding apparatus; receiving rendering information associated with the one or more received projected video frames, the rendering information including information for reversing one or more pixel region shift and/or pixel region rotation operations that were applied to pixels of one or more pixel regions of the one or more received projected video frames before encoding; and, using the rendering information to reverse the one or more pixel region shift and/or pixel region rotation operations that were applied to pixels of one or more pixel regions of the one or more received projected video frames before encoding.

In an aspect the invention relates to a method of processing spherical video data comprising: a data processor processing modified projected video frames, a modified projected video frame including one or more pixel regions, the one or more pixel regions representing pixels of spherical video data projected onto one or more 2D projection surfaces of a projection model, preferably an equirectangular or a 3D polyhedron projection model, the modified projected video frame being generated by applying one or more pixel shifts and/or pixel rotation operations to pixels of one or more pixel regions of a projected video frame prior to encoding; the processing including: the data processor receiving one or more modified projected video frames from a decoding apparatus; the data processor receiving rendering information associated with the one or more received modified projected video frames, the rendering information including information for reversing one or more pixel region shift and/or pixel region rotation operations that were applied to pixels of one or more pixel regions of projected video frames before encoding; and, the data processor using the rendering information on the modified projected video frames to reverse the one or more pixel region shift and/or pixel region rotation operations that were applied to pixels of one or more pixel regions of the projected video frames before encoding.

In an aspect, the invention may relate to a non-transitory computer-readable storage media comprising a manifest file for a client apparatus, preferably an HTTP adaptive streaming client apparatus, the manifest file comprising computer readable program code, the code comprising: one or more segment identifiers, preferably one or more URLs, for identifying one or more segments, each segment comprising a sequence of encoded projected video frames; a projected video frame including one or more pixel regions, the one or more pixel regions representing pixels of spherical video data projected onto one or more 2D projection surfaces of a projection model, preferably an equirectangular or a 3D polyhedron projection model, for projecting spherical video data onto a rectangular 2D surface of a video frame; and, client capabilities information associated with at least part of the one or more segment identifiers, the client capabilities information signaling the client apparatus that before encoding shift and/or rotation operations were applied to the pixels of the projected video frames in the one or more segments.

In an embodiment, the manifest file may further comprise a parameter, preferably an EssentialProperty descriptor, for signalling the client apparatus about a projection model that is used for the projected video frames; and/or, one or more parameters for signalling the client apparatus about the (type of) shift and/or rotation operations that were applied to the pixels in the projected video frames before encoding; and/or, about the (type of) shift and/or rotation operations that need to be applied to the projected video frames after decoding in order to reverse the shift and/or rotation operations that were applied to the pixels in the projected video frames before encoding.

The invention may also relate to a computer program product comprising software code portions configured for, when run in the memory of a computer, executing the method steps according to any of process steps described above.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIG. 1 depicts a flow-diagram of processing spherical video data.

FIG. 2 depicts an example of an equirectangular projection of spherical video data.

FIGS. 5A and 5B depicts the formation of region boundaries in a video frame comprising projected spherical data.

FIG. 6A-6C depicts the formation of region boundaries in a video frame comprising projected and mapped spherical data.

FIG. 10A-10C depict examples of image analysis for projected video frames according to an embodiment of the invention.

DETAILED DESCRIPTION

FIG. 1 depicts a high-level flow diagram of a method for processing spherical content. The process may include the capturing of multiple images (step 102) using a panoramic or 360-degree image capturing system, which typically comprises multiple, i.e. two or more image sensors. Images of overlapping field of views, generated by different image sensors, may be stitched together (step 104) into one panorama or high-resolution image.

The stitching of images into one image is a well-known image processing technique, that typically includes alignment and panorama composition. In the alignment process, feature descriptors may be extracted from images in order to find corresponding image features. The alignment is used to estimate the image camera pose or orientation of each image. The panorama composition procedure subsequently uses this information for combining all images into one panorama image. Image blending may be used to seamlessly stich the thus combined images together. The stitching of the images may be in a 2D or 3D plane. For example, images may be stitched to each other onto a spherical surface thereby forming a spherical video data.

Thereafter, the spherical video data may be transformed by projection and mapping operations (step 106) into 2D rectangular video frames which are encoded by a state-of-the-art video encoder (step 108). The encoded video data may be encapsulated into a transport container so that the video data can be transmitted to a playout device, which is configured to decode the video data (step 110) into 2D rectangular frames. For presentation of the content to the user, the playout device renders a 3D (polyhedronic) object, and textures it with the video frames (step 114). Depending on the projection that was used, the 2D rectangular frames are then transformed back into spherical video data by reversing the packing, mapping and projection operations (step 112). Typically process steps 106-108 may be implemented in a video encoder apparatus and steps 110-114 may be implemented in a media playback devices connected to or integrated in e.g. an head mounted display (HMDs), which are configured to decode and render the encoded spherical video data.

The transformation of the spherical video data by projection and mapping operations into 2D rectangular video frames is described in more detail with reference to FIG. 2-4.

FIG. 2 depicts an example of an equirectangular projection operation 204 of spherical video data 202, represented as pixels on a spherical surface (e.g. a sphere or a squished sphere), onto a rectangular 2D video frame 206. This projection operation may be used to directly transform pixels associated with spherical coordinates $\phi$, $\theta$ to pixels associated with planar 2D coordinates X,Y.

Figure 3:
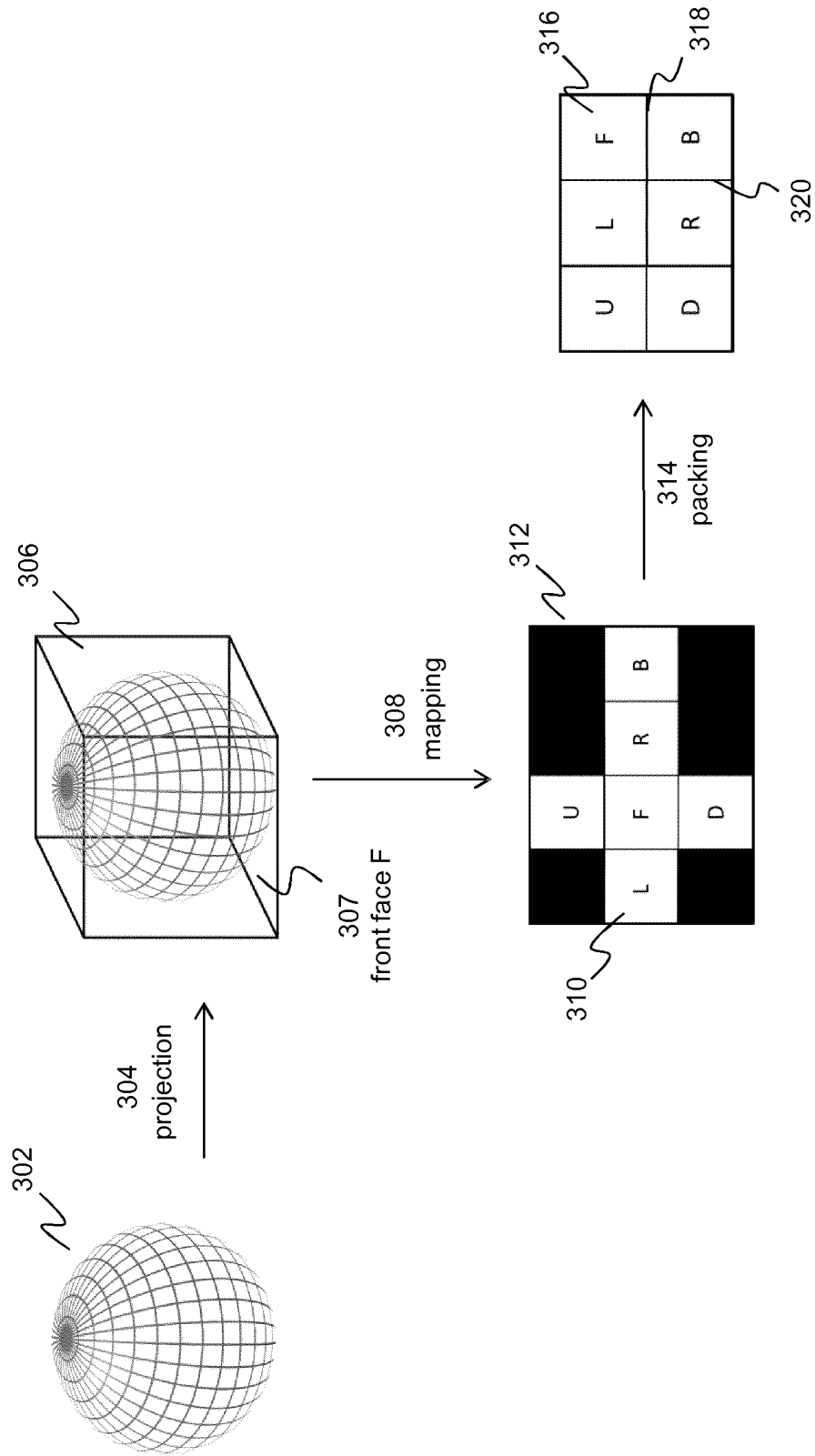
FIG. 3 depicts an example of a projection and a mapping of spherical video data onto a video frame.

Similarly, FIG. 3 depicts an example of projecting of spherical video data 302 onto a rectangular video frame using a cube projection model. In particular, FIG. 3 depicts a projection operation 304 of the spherical video data onto the faces 306 of a cube. These faces may be referred to as the 2D projection faces. The orientation of the sphere and the cube may be described using a 3D coordinate system such that different orientations of the sphere, the cube and the sphere relative to the cube can be defined. For example, in such coordinate system the cube faces may be labelled as front face (F), up face (U), down face (D), left face (L), right face (R) and back face (B). After the projection of the pixels onto the projection faces, the projection faces of the cube are mapped 308 onto a planar 2D rectangular video frame 312. Here, the pixels belonging to a projection face may be referred to as a pixel region or in short a region. For example, the pixels associated with the front projection face F 307 of the cube may form pixel region F in the rectangular video frame 312.

Hence, as shown in FIG. 3, during the mapping operation 308, the cube comprising projected pixels on its faces may be unfolded and arranged in a rectangular 2D area forming a video frame. The thus formed video frame may be referred to as a projected video frame. A projected video frame comprises an arrangement of pixel regions wherein edges of pixel regions may form region boundaries. The artificial region boundaries are a direct consequence of the projection/mapping operation and the shape of the pixel regions are a direct consequence of the projection model that is use (in this case a cube projection model).

The pixel regions in the projected video frame may be rearranged and resized in order to remove black spaces. The process of rearranging the pixel regions may be referred to as packing 314. The resulting projected video frame includes a 2D arrangement of pixel regions 316 including horizontally and vertically arranged region boundaries 318,320.

More generally, transforming spherical video data into a rectangular video frame may include a projection of the spherical video data onto one or more 2D projection faces of a projection model, typically a 3D polyhedron such as a cube or a pyramid, followed by a mapping the faces onto a rectangular frame. The faces of the 3D projection model may be referred to as projection faces and a video frame resulting from the projection operation onto the projection faces may be referred to as a projected video frame. A projected video frame may include pixel regions (blocks of pixels) that match the 2D projection faces of the projection model that was used (e.g. the faces of a cube). The pixel regions are arranged to form a rectangular video frame wherein the edges of the pixel regions may form region boundaries of the projected video frame. A projected video frame comprising a packed arrangement of pixel regions may also be referred to as a region-wise packed video frame. It is to be noted that the equirectangular projection model results in a frame that only has one pixel region, unlike the other projection models that generate frames having a plurality of pixel regions.

Figure 4:
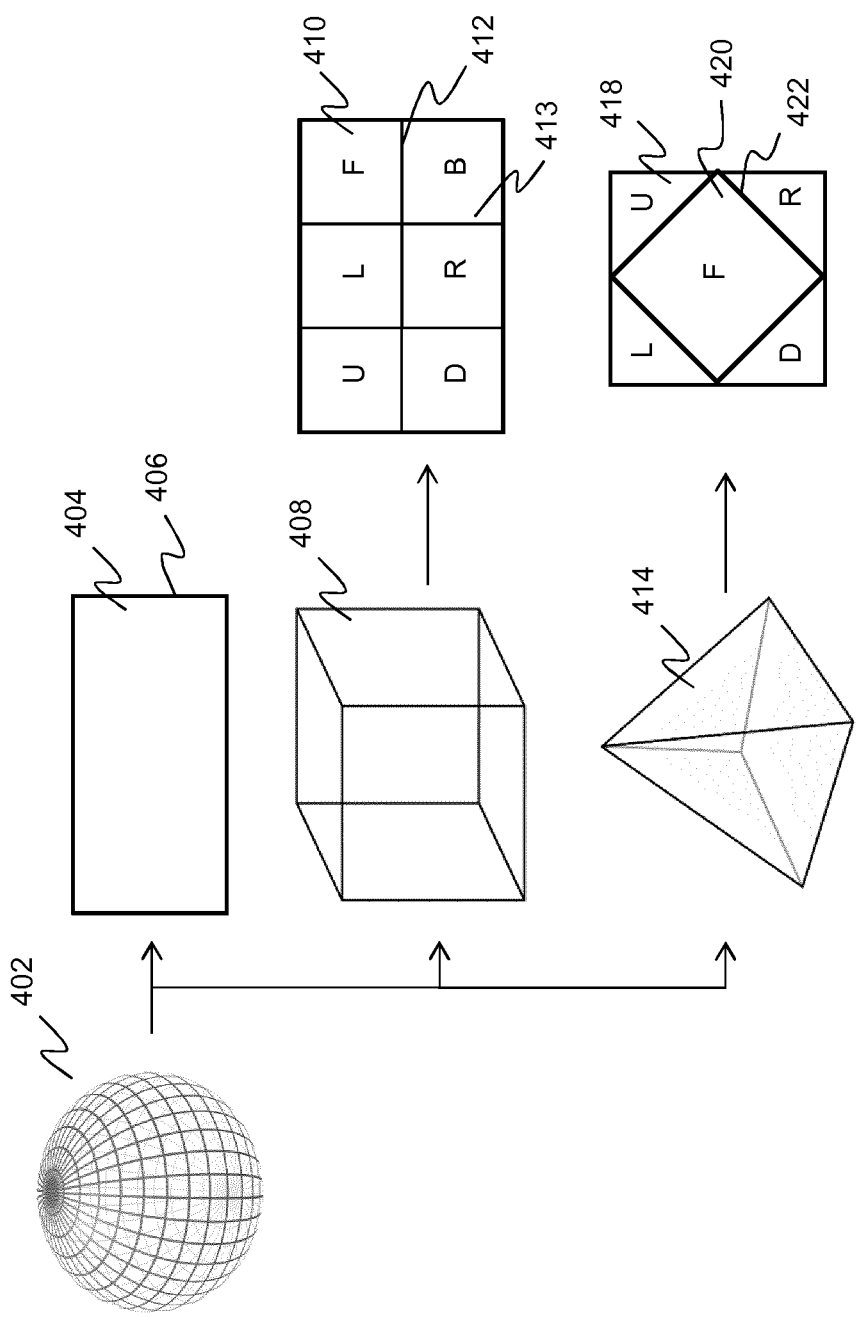
FIG. 4 depicts different projections and mappings of spherical video data onto a video frame.

As shown in FIG. 4, depending on the selected projection model, i.e. equirectangular 404, cubic 408, pyramid 414, etc. different arrangements of pixel regions 404,410,418,420 and associated region boundaries 406,412,413,422 in the projected video frames may be obtained. The spherical video data 402 that is projected onto the projection faces is mapped and packed into a projected video frame wherein each projection face represents pixel region of a predetermined geometry and wherein the boundaries of neighbouring pixel regions form artificial region boundaries. A shown in FIG. 4, depending on the projection type the region boundaries may have different orientations in the video frame. Many different projection types may be used including but not limited to a cylinder, a polyhedron (e.g. an octahedron or an icosahedron), a truncated pyramid, segmented sphere, etc.

The combined steps of projecting, mapping and, optionally, packing spherical video data into a projected video frame results in the generation of boundaries—which depending on the projection type may include horizontal, vertical, diagonal and/or off-diagonal region boundaries—that are not present in the spherical video data. These boundaries are artificial, in that they do not represent an actual, physical boundary in the captured scene, and are the result of the projection and/or packing processes.

FIGS. 5A and 5B depicts the formation of region boundaries in a video frame comprising projected spherical data. In particular, FIGS. 5A and 5B depict an output of a two-lens 360 degree camera system. FIG. 5A depicts image data captured by the system wherein an object of interest (a person) is captured by the front lens. In the associated equirectangular projected (ERP) video frame represents a projected video frame wherein the captured object of interest is located in the centre of the video frame. In this case, state of the art coding schemes can accurately predict moved pixels of the object in the picture (a moving figure) using similar pixels in future or previous video frames. In addition, pixels blocks in the projected video frame associated with the object may be closely predicted by available neighbouring blocks in the same video frame. In contrast, if the object was captured by the back lens as shown in FIG. 5B, the object will be split across the frame boundary of the associated ERP video frame.

When using more complex projections, such as a cubic projection, additional boundaries may be introduced in the associated packed video frame. These boundaries are related to the boundaries of the faces of the cube model that was used in the projection. The formation of region boundaries in a video frame associated with a cubic projection is depicted in FIG. 6A-6C. As shown in these figures natural movement in the scene, captured as a continuous movement in the 3D sphere, may lead to artificial movement in the projected and mapped video, resulting in edge artefacts across the cube faces.

A projection of the spherical video data as illustrated in FIGS. 5 and 6 thus results in boundaries which may negatively influence the coding performance, i.e. the encoding efficiently and visual quality of the associated decoded pictures. These boundaries hereafter are referred to as region boundaries. When encoding such video content with a state-of-the art encoding scheme, such as H.264/AVC or HEVC, the introduced motion may lead to a reduced coding performance; e.g. a higher visual impairment at a given target bit rate, or a higher bit rate for a target visual quality.

Since standardized and commercially available video encoding schemes, and reference video encoding scheme implementations from standardization bodies, employ motion compensation, such large and artificial movements increase the entropy in the motion vectors and reduce the compression gain. In the most extreme case, the motion vectors are restricted to a certain area of the frame. In that case, no motion vector will be use to predict between different video frames an object going from one frame edge to another, thereby decreasing the ability of the encoder to efficiently compress the video sequence.

In addition, standardized and commercially available video encoding schemes, and reference video encoding scheme implementations from standardization bodies employ spatial prediction, and large and artificial movements across region boundaries decrease the ability of the encoder to efficiently
predict pixels blocks in the projected video frame by available neighbouring blocks in the same video frame, thereby decreasing the ability of the encoder to efficiently compress the video sequence.

It is an aim of the embodiments in this disclosure to reduce the detrimental effect of the region boundaries which may cause encoding inefficiency and/or artifacts when encoding projected video frames. The main insight of the embodiments in this disclosure is that before encoding, the content in a projected video frame is pre-processed in order to increase the coding efficiency and reduce the risk of artifacts and thus increase the visual quality of the rendered content. The pre-processing may include shifting and/or rotating the pixels or pixel regions in a projected video frame in order minimize detrimental effects due to the region boundaries on the coding performance and the visual quality of the rendered content. The selection of the shift and/or rotation operations that may provide such improved performance may be based on image analysis of different configurations of shift and/or rotation operations of a projected video frame.

This optimization process is thus performed in the decoded and uncompressed (e.g. raw image format) domain. As will be shown hereunder in more detail, the invention may be implemented as a data processing step before encoding such that the invention does not dependent on the codec that is used for encoding and decoding the spherical video data.

Figures 7A, 7B:
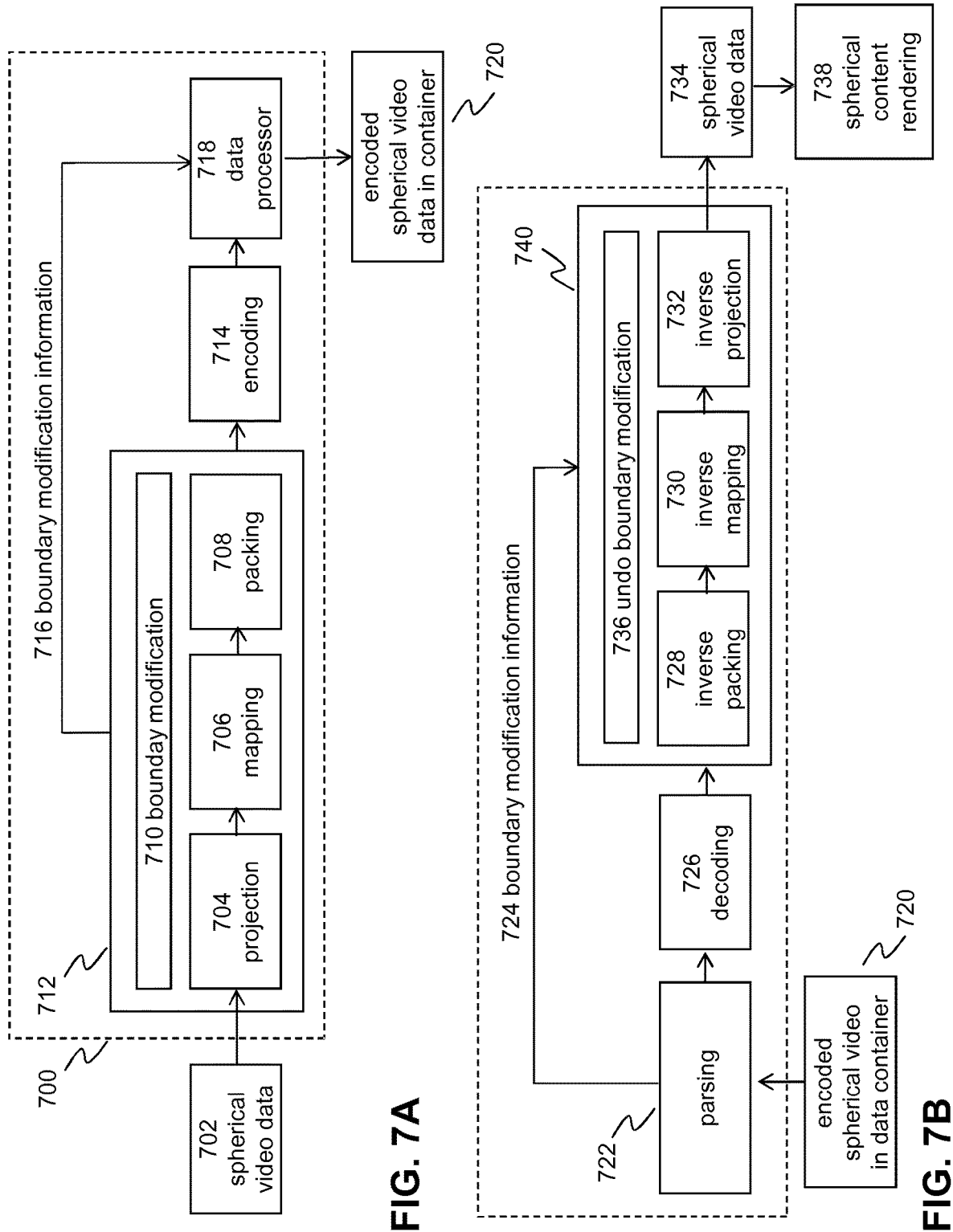
FIGS. 7A and 7B depict flow diagrams of methods for processing spherical content according to various embodiments of the invention.

FIGS. 7A and 7B depict flow diagrams of methods for processing spherical content according to various embodiments of the invention. The flow diagram of FIG. 7A may be implemented in an encoder system 700 comprising a first data processor 712 for processing spherical video data 702 prior to encoding, an encoding apparatus 714 for encoding the processed spherical video data and a second data processor 718 for encapsulating encoded spherical video data in a data container so that it can be stored and transmitted to a media playout device. Similarly, the flow diagram of FIG. 7B may be implemented in a media playout device comprising a parser 722 for parsing the data container 720 comprising the encoded spherical video data, a decoder apparatus 726 for decoding the encoded spherical video data, a data processor 740 for processing the decoded video frames comprising (uncompressed) spherical video data and a rendering engine for rendering the spherical content.

The flow diagram of FIG. 7A of processing spherical video data according to an embodiment of the invention. In particular, FIG. 7A depicts a method for transforming spherical video data into a data container comprising encoded packed video frames wherein before encoding a packed video frame, the region boundaries in a packed video frame are modified. As will be described hereunder in more detail, the region boundaries in a projected video frame are modified by shifting, e.g. translating, and/or rotating, pixels or group of pixels such as pixel regions such that the coding performance and/or the computational complexity of the encoding process may be reduced.

As shown in FIG. 7A, the spherical data 702 may be processed into a projected video frame, which may be a packed video frame, which is a more compact representation of a projected video frame, in a similar way as described with reference to FIG. 1-4. The process may include at least a projection step 70 and a mapping step 706 in order to generate a projected video frame. Optionally, a packing step 708 may be applied to the projected video frame in order to obtain a packed video frame, a more compact version of the projected video frame. For the purpose of this application, a packed video frame is a projected video frame in which the pixel regions are rearranged on the basis of a packing process.

A boundary modification step 710 may include a function adapted to execute image processing operations that shift and/or rotate at least part of the projected spherical content, e.g. pixel regions. The boundary modification step may introduce modifications (i.e. shift and/or rotation of pixels or pixel regions) into a projected video frame such that the resulting projected video frame, an optimized projected video frame, may be encoded more efficiently when compared with the original non-modified projected video frame.

The optimized projected video frame may be determined by comparing an image analysis of the selected projected video frame with the image analysis of different modified versions of the selected projected video frame, wherein the different modified versions are generated by applying different shift and/or rotation operations to one or more pixel regions of the selected projected video frame. Here, the image analysis may be any state of the art image analysis including but not limited to entropy analysis, a saliency analysis, a motion analysis, an object analysis, a colour shift analysis, a boundary analysis, an edge detection analysis.

The modification of the region boundaries that results in an optimized projected video frame may be introduced at various stages of processing steps 704-708. For example, a modification of the region boundaries may be achieved before the process of projection and mapping the spherical video data onto a projected video frame, e.g. by rotating the sphere associated with the spherical video data or—in case of a simple two-camera system—lens swapping. A modification of the region boundaries may also be achieved after projection and before mapping or after projection and mapping, e.g. by rotating and/or translating the faces of the 3D projection model relative to the sphere or by changing the frame packing of a packed video frame.

Figure 8:
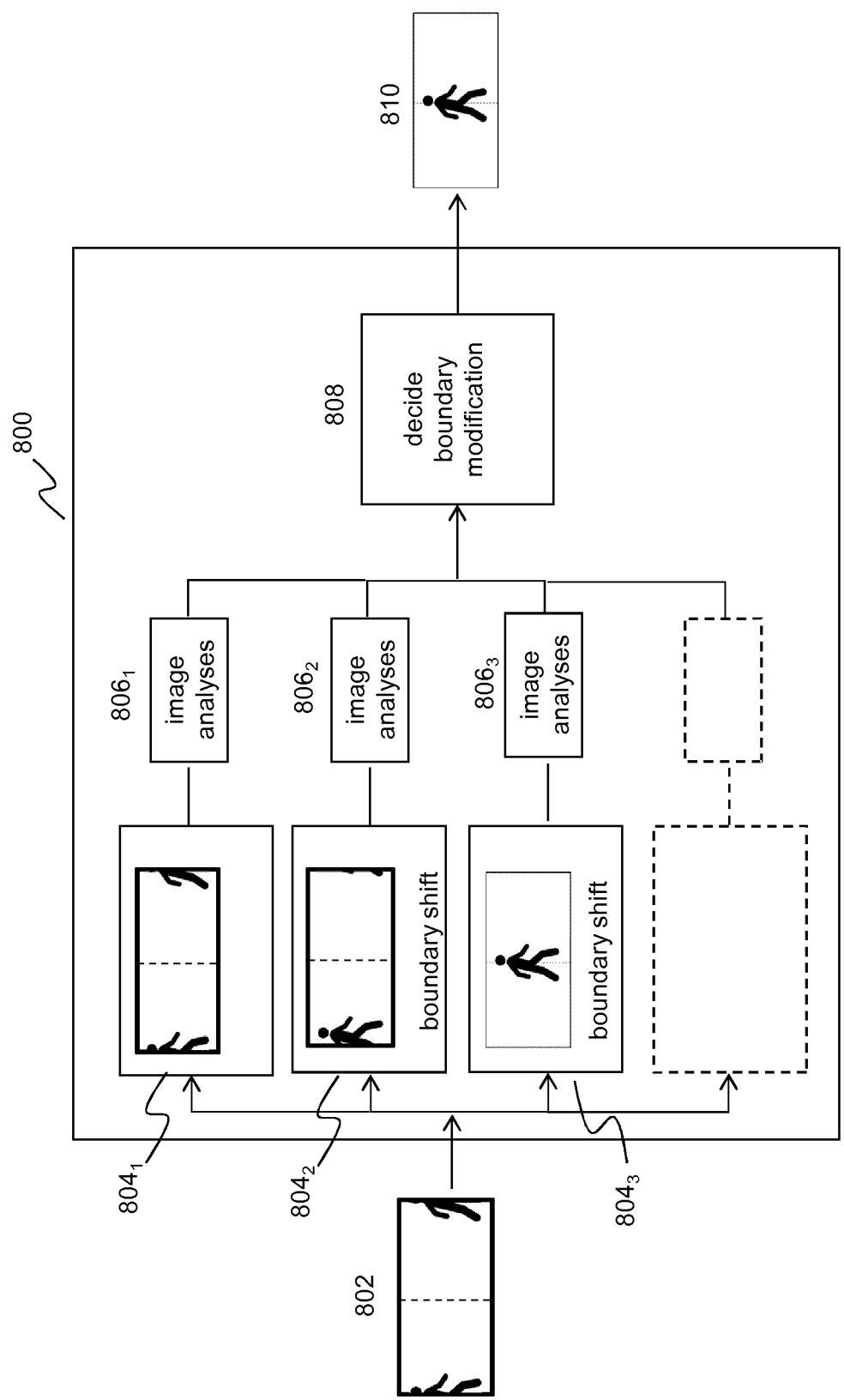
FIG. 8 depicts a boundary modification function according to an embodiment of the invention.

A boundary modification function according to an embodiment of the invention is depicted in FIG. 8. In this embodiment, a region boundary modification (in short a boundary modification) may be determined for projected spherical video data based on an equirectangular projection. The boundary modification function 800 may receive a projected video frame 802 comprising an equirectangular projection of spherical video data. In this example, the projected video frame may comprise a moving object, which is crossing the region boundaries (in this case the left and right side of the video frame) resulting the object being split in two: i.e. a part of the moving object being at the left side of the projected video frame and the other part of the moving object being at the right side of the projected video frame. In order to reduce the detrimental effect of such splitting, the boundary modification function may generate modified, in this case shifted versions 804$_{2-n}$ of the projected video frame 804$_1$. As shown in FIG. 8, the shift translates the projected content relative to the region boundaries, which in case of an equirectangular projected coincide with the boundaries of the 2D video frame. Then, each shifted version of the projected video frame may be input to an image processing module 804$_{1-n}$ which may analyse the projected video frame on the basis of one or more image processing parameters.

The boundary analysis process may include determining a modified (shifted) version of the projected video frame in which the information density at the region boundaries is minimal 808. For example, as shown in FIG. 8 the boundary modification function may determine that an advantageous modification may be a horizontal shift of pixels representing a 180-degree rotation of the spherical video data resulting in a modified projected video frame 810 that is optimized for encoding. This boundary modification may be advantageous because, when applying this shift, encoding inefficiencies associated with areas of high information density, e.g. a moving object, crossing the region boundaries can be minimized. Also, the correlation between pixels on each side of the region boundary may be minimized or at least significantly reduced.

As an example of the increased coding performance of the proposed method, table 1 provides measurement results for a video with resolution 1920×1080 pixels.

TABLE 1 measurement results for four encoder settings.

| | Reference | | | | Test signal | | | |
|---|---|---|---|---|---|---|---|---|
| Encoder setting | kbps | Y psnr | U psnr | V psnr | Kbps | Y psnr | U psnr | V psnr |
| 22 | 3547 | 48.6 | 51.4 | 51.3 | 3547 | 48.6 | 51.4 | 51.3 |
| 27 | 1327 | 45.7 | 49.6 | 49.3 | 1327 | 45.7 | 49.6 | 49.3 |
| 32 | 607 | 42.9 | 48.1 | 47.7 | 607 | 42.9 | 48.1 | 47.7 |
| 37 | 312 | 40.1 | 46.9 | 46.6 | 312 | 40.1 | 46.9 | 46.6 |

The reference video signal comprises equirectangular projected video frames representing content that is similar to the input frame 802 of FIG. 8, i.e. a projected video frame in which pixels representing an object, in this case a moving person, is split in two due to the region boundary associated with the equirectangular projection. The test video signal comprises modified projected video frames, with a constant horizontal pixel shift (translation) of 960 pixels. The modified video represents content that is similar to the output frame 802 of FIG. 8, i.e. a modified projected video frame in which pixels representing the object is positioned approximately in the middle of the video frame.

Measurement results were generated for four different encoder settings, where the encoder quality parameter is varied. The measurement results consists of four bit rate values, expressed in kilobits per second (kbps), and four peak Signal-to-Noise ratio (psnr) values for each of the three components of the YUV colour space, i.e. one luma component (Y) and two chrominance components U and V.

Based on these measurements results, the coding performance was computed by averaging over the four encoder settings and expressed in rate-distortion cost percentage. The result of this computation is provided in table 2:

TABLE 2 measurement results for four encoder settings.
Encoder performance (R, D)

| Y | U | V |
|---|---|---|
| −2.5% | −5.5% | −3.2% |

Here, values indicate a lower cost and thus better encoding performance over all colour space components, ranging from −2.5% to −5.5%. These experimental data show that the encoding efficient correlates with discontinuities introduced in objects due to projection boundaries. The invention uses this correlation in order to improve the coding efficiency of the projected video frames and/or visual quality of the rendered spherical content on the basis of pre-processing step.

Figure 9:
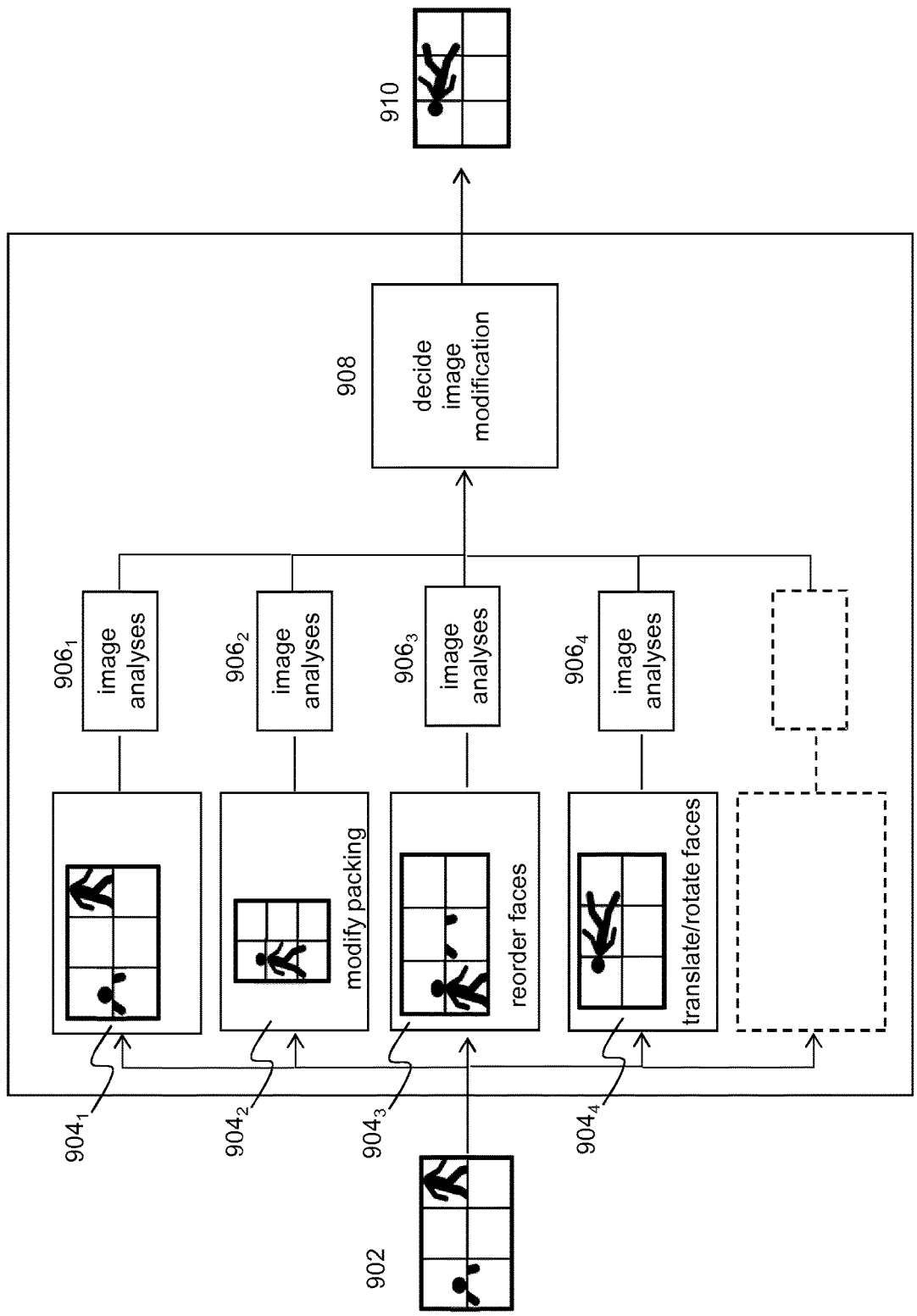
FIG. 9 depicts a boundary modification function according to another embodiment of the invention.

FIG. 9 depicts a boundary modification function according to another embodiment of the invention. In this embodiment, a region boundary modification for projected video frames based on a cube projection that provides or at least is expected to provide an improved coding efficiency and/or visual quality. In this particular embodiment, the region boundaries may be modified both horizontal and vertical by shifting (translating) and/or rotating the pixel regions, in this case six square pixel regions, in a projected video frame.

For example, in an embodiment, a boundary modification may be determined by changing the frame packing of the packed video frame that is input to the boundary modification function. For example, as shown in FIG. 9, a projected video frame 902 may be fed to the input of the function and the function may apply different pixel region shifts and/or rotations. The packing of the initial projected video frame may be rearranged such that the frame packing may change from a projected video frame having a 2×3 packing $904_1$ into a modified projected video frame having a 3×2 packing $904_2$. In an embodiment, a boundary modification may be achieved by reordering, e.g. translate, the pixel regions of the projected video frame that is input to the function. For example, as shown in FIG. 9, the pixel regions may be changed from a U|L|F-D|R|B pixel region arrangement of projected video frame $904_1$ to an U|L|R-F|D|B pixel region arrangement of modified projected video frame $904_3$. In yet another embodiment, a boundary modification may be achieved by rotating and, optionally, reordering the pixel regions of projected video frame $904_1$ that is input to the boundary modification function resulting e.g. in a modified projected video frame $904_4$. Each of these modified packed video frames $904_{1-n}$ may be analysed by one or more image analysis modules $906_{1-n}$.

A suitable image analysis of the different modified projected video frames may be used in order to determine a image analysis parameter for each projected video frame which is expected to correlate with an improved coding efficiency. An image analysis parameter for each modified projected video frame may be determined and the modified projected video frame that has a maximum or minimum value may be selected for input to the encoder. The modified projected video frame associated with this selected value may be referred to as the optimized projected video frame.

State-of-the-art video analysis techniques may be employed for determining an image analysis parameter that correlates with encoding efficiency. These image analysis techniques include but are not limited to edge detection, entropy or saliency analysis, motion and object analysis, colour shift analysis, and combinations thereof. This analysis may include the use of a movement heat map, saliency map, or a map with detected edges. This analysis may be performed on a sequence of projected video frames.

Motion saliency methods are based on analysing spectral statistics of frequencies, the Fourier spectrum within a video or colour and motion statistics, or by comparing local contrast between feature distributions. Object detection and tracking may be performed by extracting content features with using e.g. well-known techniques in the field such as Scale-invariant feature transform (SIFT), speeded up robust features SURF methods, the ISO/IEC 15938-13 Compact Descriptors for Visual Search, etc. Edge detection analysis may be performed by computing variations of colour intensity or grey levels, through first or second order derivative methods, or the optimal canny edge detection method.

The boundary modification functions described with reference to FIGS. 8 and 9 may be executed by a processor configured to pre-process spherical video data before being fed to the input of an encoder.

Figure 10C:
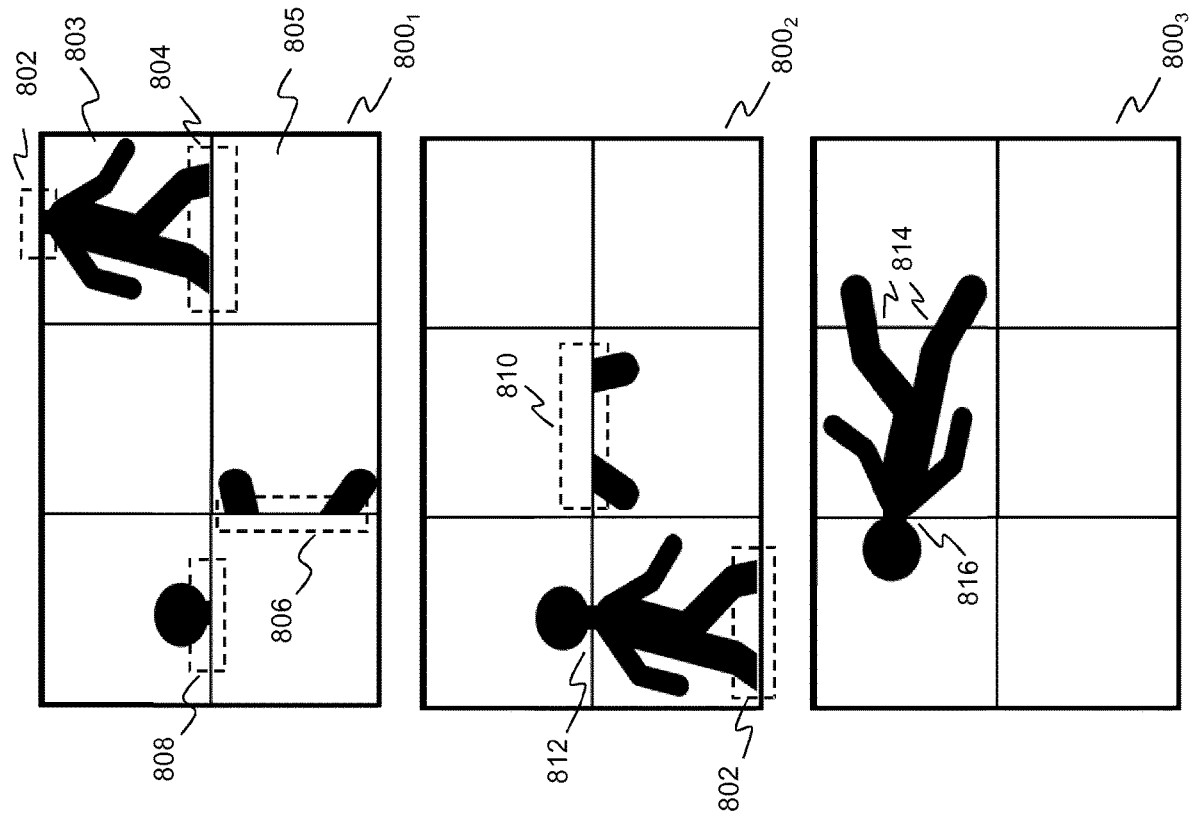

FIG. 10A-10C depict examples of image analysis for (modified) projected video frames according to an embodiment of the invention. For example, FIGS. 10A and 10B illustrate an embodiment of a global image analysis for determining a global image analysis parameter which correlates or which is expected to correlate with the coding efficiency and/or visual quality of the decoded content of a projected video frame. In such global image analysis technique the projection boundaries are not taken into account and a parameter value is determined on the basis of the pixel configuration of the projected video frame as a whole.

FIGS. 10A and 10B depicts a global contrast-based saliency map for identifying salient regions in modified projected video frames as e.g. shown in FIGS. 8 and 9. In these figures areas of high saliency are indicated as white. The variance of the position of the white pixels may provide a measure for how compact the high saliency region is and thus may be used as a criterion to minimize the chance of region boundaries splitting the interesting objects in the scene. Hence, depending on the pixel shift, pixel region translation and/or rotations that is introduced in a projected video frame, the amount of high saliency areas may increase or decrease. Hence, this parameter may be used to determine a modified projected video frame that has a minimal amount of areas of high saliency (using e.g. a process as illustrated in FIG. 8 or 9).

The modified projected video frame for which the global image processing parameter, e.g. the amount of high saliency areas, is minimal may be selected as the optimized projected video frame as it expected that the amount of high saliency areas in a video frame correlates with the coding efficiency (a large amount of areas of high saliency decreases the coding efficiency).

FIG. 10C illustrates an embodiment of a local image analysis for determining a local image analysis parameter which correlates with coding efficiency and/or visual quality of the decoded content of a projected video frame. In such local image analysis technique the projection boundaries are analysed locally. For example, in FIG. 10C three different modified projected video frames $100_{1-3}$ are depicted. An image analysis algorithm may be used that generates a parameter that provides a measure for the amount of object discontinuities at the region boundaries. To that end, the image analysis algorithm may locally examine pixels at the boundaries of pixel regions. For example, in the first modified projected video frame state-of-the-art image analysis techniques may be used to determine areas along the boundaries of the pixel region that exhibit sharp discontinuities. For example, the image analysis algorithm may determine three in-frame boundary areas 804,806,808 which exhibit sharp pixel discontinuities that coincide with the pixel boundaries. For example, boundary area 804 exhibit two locations along the region boundary that comprise a sharp artificial discontinuity that aligns with the region boundary between pixel region 803 and pixel region 805. Similarly, the image analysis algorithm may determine sharp pixel discontinuities 802 that coincide with the pixel boundaries that are part of the boundary (the edge) of the projected video frame.

The image analysis algorithm may determine a local image analysis parameter that provides a measure of the amount of pixel discontinuities at the region borders, especially pixel discontinuities at the region borders that relate to moving object and/or highly textured objects. Such analysis may be repeated for different modified projected vide frames. As shown in FIG. 10C other arrangements of pixel regions may comprise less pixel discontinuities at the region boundaries. For example, projected video frame $100_2$ may comprise two areas comprising a sharp artificial discontinuity that aligns with the region boundary and projected video frame $100_3$ may comprise no areas along the region boundaries comprising a sharp artificial discontinuity.

This way, the modified projected video frame for which the local image processing parameter, e.g. the amount of pixel discontinuities at the region borders, is minimal may be selected as the optimized projected video frame as it expected that the amount of discontinuities at the region borders in a video frame correlates with the coding efficiency (a large amount of areas of discontinuities decreases the coding efficiency).

Figure 11:
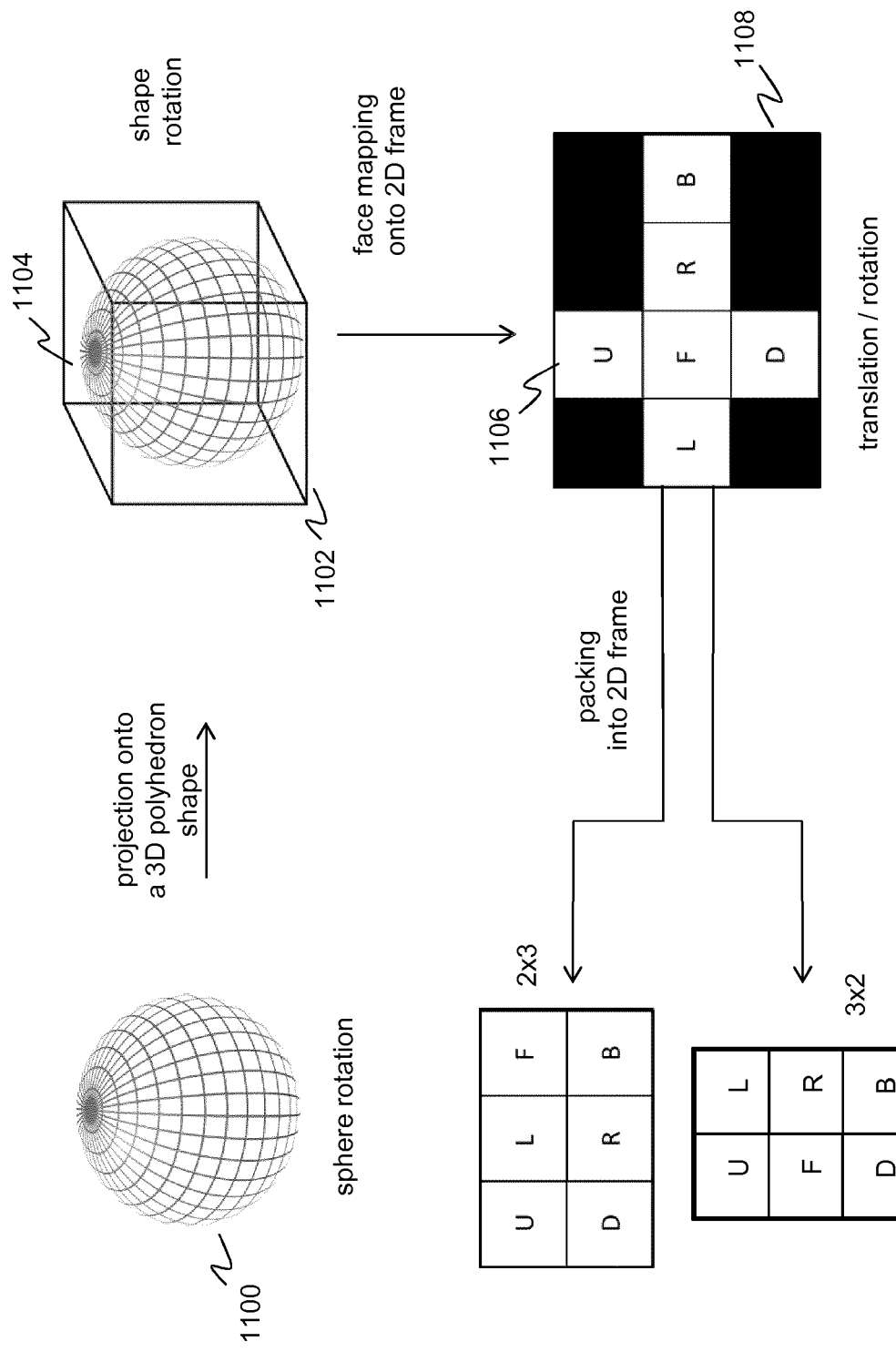
FIG. 11 depicts modifying the region boundaries in a projected video frame according to various embodiments of the invention.

As mentioned with reference to spherical video data processing method of FIG. 7A, the modification of the region boundaries may be introduced at various stages of processing steps 704-708. This is schematically illustrated in FIG. 11 which depicts various ways of modifying the region boundaries according to various embodiments of the invention. The boundary modifications are illustrated for a cubic projection. As shown in this figure, modification of the region boundaries may be obtained by rotating the spherical video data, in particular the pixels on the spherical surface 1100, in a predetermined direction. Here, the rotation may be defined as a rotation vector expressed in suitable coordinates, e.g. spherical coordinates defining a yaw, pitch and roll.

Alternatively, in an embodiment, when considering a sphere in a cube projection model, a modification of the region boundaries may be obtained by rotating the cube 1102 relative to the sphere 1104. In another embodiment, a modification may be obtained by translating and/or rotating the pixel regions $1106_{1-6}$ of the projected (unpacked) video frame 1108. In a further embodiment, a modification may be obtained by re-arranging the frame packing of a projected (packed) video frame; and/or, translating and/or rotating the pixel regions associated with the projection faces in a packed video frame.

Shifting, in particular translating, the mapped and projected spherical video data in a projected video frame corresponds to a rotation of the content sphere. Hence, if a modification of the region boundaries is expressed as a rotation of the sphere of pixels, first the content sphere needs to be constructed from the projected video frame and then the rotation of the sphere may be applied followed by re-applying the projection and mapping in order to obtain a modified projected video frame.

Figure 12:
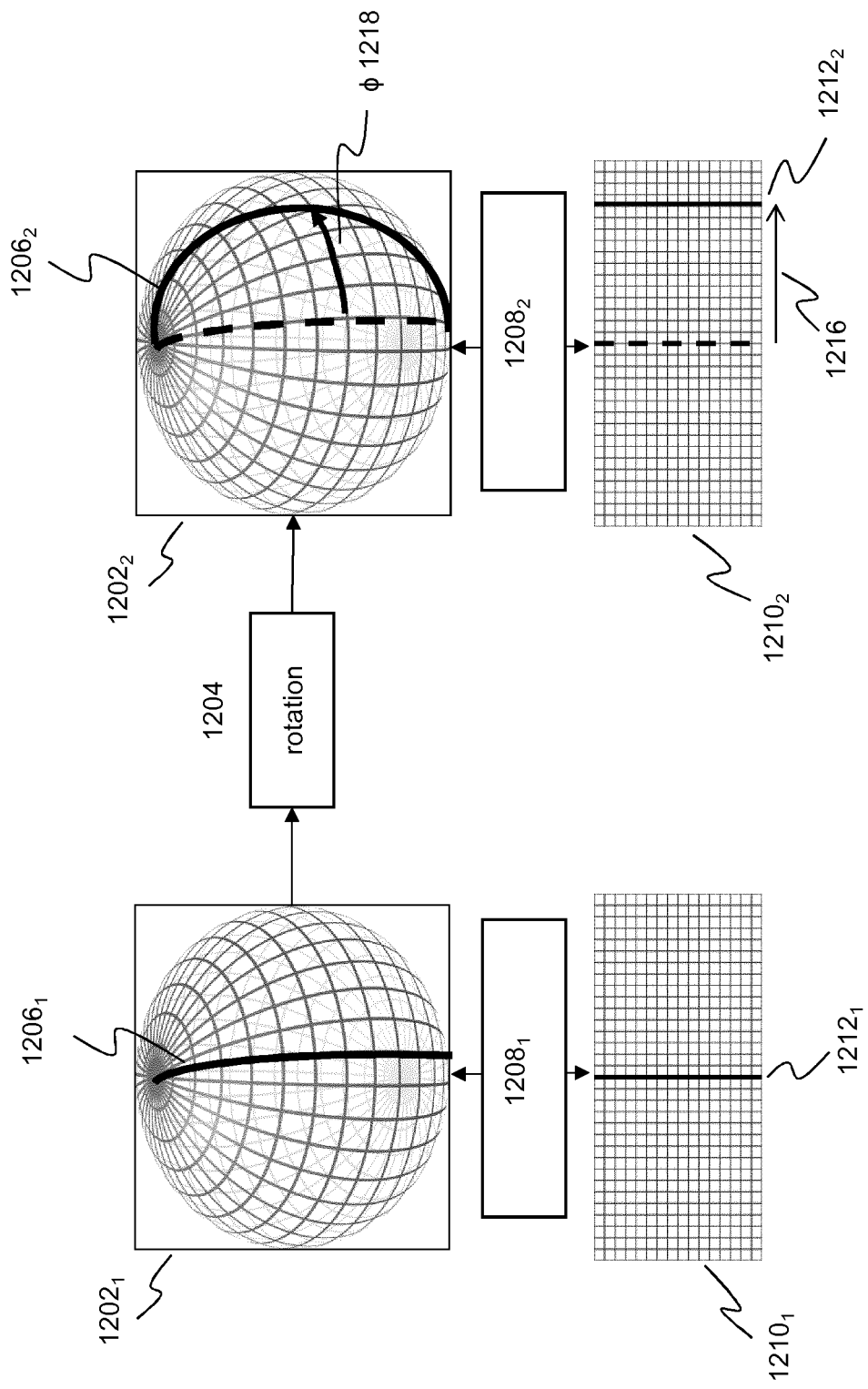
FIG. 12 depicts a modification of the region boundaries according to another embodiment of the invention.

An example of such modification of the region boundaries is depicted in FIG. 12, which shows a shift of a video frame comprising equirectagular projected spherical video data by an arbitrary rotation angle. In order to achieve the shift, a first content sphere $1202_1$ comprising first spherical video data may be subjected to a certain rotation operation 1204, e.g. rotated over a polar angle $\phi$ 1218, as shown in FIG. 12. The rotation operation may result in rotated second spherical video data as depicted by content second sphere $1202_2$. Here, the first and second content sphere may be associated with a first projected video frame and a second modified projected video frame using a projection model, in this case an equirectangular projection model $1208_{1,2}$. A thick reference line $1206_{1,2}$ over the sphere represents a virtual reference to visualize the rotation. The reference line on the content sphere may correspond to a reference line $1212_{1,2}$ on the equirectangular projected video frames $1210_{1,2}$. Hence, the rotation of the sphere results in a shift 1216 of the pixels in the equirectangular projected video frame to the right by a certain amount as shown in the modified (shifted) projected video frame.

Hence, as illustrated with reference to FIG. 8-12, before encoding projected video frames comprising the projected spherical video content, a suitable modification of the region boundaries is determined. In an embodiment, a region boundary modification may be applied to each video frame. In another embodiment, a region boundary modification may be applied to a group of consecutive video frames, e.g. a group of pictures (GOP). In yet another embodiment, the application of a region boundary modification may be decided on a frame by frame basis.

In FIG. 7A, the boundary modification step 710 and the projection, mapping and packing steps 704-708 may be implemented as a pre-processing step that is applied to the spherical video data before the encoding step 714. This way, the invention may be used with a state-of-the art HEVC/H.265 or another coding system such as AVC/H.264, VP8, VP9, VP10, etc. When introducing the boundary modification in a projected video frame, boundary modification information 716 is generated. The boundary modification information is configured to enable a media playout apparatus, after decoding the encoded spherical video data to apply (at least) the inverse boundary modification before rendering the spherical video data.

In an embodiment, the boundary modification information may signal a processor in a media playout apparatus the type of boundary modification that was applied to projected video frames before the encoding process. In another embodiment, the boundary modification information may signal a processor in a media playout apparatus a region boundary modification that reverses the region boundary modification that was applied to the projected frames before the encoding process.

Rendering information according to the invention may comprise boundary modification information. That is the term boundary information as applied here and for the purpose of this invention may relate to information for enabling a a data processor of a video rendering apparatus, preferably as a post-decoding operation, to reverse the selected one or more pixel shift and/or pixel rotation operations applied to pixels of one or more pixel regions of a projected video frame.

Thereafter, a processor may encapsulate encoded spherical video data (e.g. encoded spherical video data associated with projected or packed video frames) and boundary modification information in a suitable data container format. For example, in an embodiment, the encoded spherical video data and the boundary modification information may be formatted according to an ISOBMFF type data container format. The thus generated data file may be used to store spherical video content and transmit (e.g. stream) spherical video content to a media playout apparatus. In other embodiment, the boundary modification information may be stored separately from the encoded spherical video data and transmitted separately from the encoded spherical video data to a media playout apparatus.

The modification information associated with the modification that has been applied during the pre-processing step 712 of FIG. 7A may be sent to the media playout apparatus in different ways.

In an embodiment, the boundary modification information may be signalled to a processor in the media playout apparatus in a box in the video track metadata of an ISOBMFF type of file. For example, in an embodiment the boundary modification information may be provided in a box BoundaryShiftToSampleBox inside the Sample Table Box ('stbl') of an ISOBMFF type of file. Here, the boundary modification information may be defined as a rotation vector (in terms of yaw, pitch and roll) that needs to be applied to the spherical video data:

--- aligned(8) class BoundaryShiftToSampleBox
    extends FullBox('bsts', version = 0, 0) {

```
        unsigned int(32) entry_count;
        int i;
        for (i=0; i < entry_count; i++) {
            unsigned int(32) sample_count;
            unsigned int(8) rotation_yaw;
            bit(1) sign_rotation_yaw;
            unsigned int(8) rotation_pitch;
            bit(1) ssign_rotation_pitch;
            unsigned int(8) rotation_roll;
            bit(1) sign_rotation_roll;
        }
}
```

In an embodiment a boundary modification parameter value may apply to multiple video frames e.g. video frames defining a group of pictures (GOP). For example, a rotation vector of the sphere may be provided for each sample (frame) in the group. For data compactness, the box further provides for each boundary modification parameter value, the number (sample_count) of video samples (video frames) to which the boundary modification parameter value applies.

In an embodiment, the boundary modification information may be stored in a metadata track that is linked to the video track in the ISOBMFF container. For example, the sample entry associated with the video track specifies the type of the decoder needed to decode the stream and any parameterization of that decoder needed. This way, for each sample (video frame) of the video track, there is a sample in the metadata track that provides the boundary modification information. This embodiment is particularly suited for content in which variations of the boundary modification are highly dynamic up to frame level. To this end, a sample entry for boundary modification may be defined (e.g. 'bomo') that defines the sample values as rotation vectors that needs to be applied to the spherical video data. In that case, the sample value of the type 'bomo' may comprise the same parameters as described with the BoundaryShiftToSampleBox example above:

```
        unsigned int(8) rotation_yaw;
        bit(1) sign_rotation_yaw;
        unsigned int(8) rotation_pitch;
        bit(1) ssign_rotation_pitch;
        unsigned int(8) rotation_roll;
        bit(1) sign_rotation_roll;
```

In an embodiment, the boundary modification information may signal a pixel shift (in the form of a pixel translation) to a processor in a media playout device, to indicate a frame boundary shift in an ERP projected video. In an embodiment, the boundary modification information may be provided in a box BoundaryShiftToSampleBox inside the Sample Table Box ('stbl') of an ISOBMFF type of file. An example of such box may look as follows:

```
aligned(8) class BoundaryShiftToSampleBox
    extends FullBox('bsts', version = 0, 0) {
    unsigned int(32) entry_count;
    int i;
    for (i=0; i < entry_count; i++) {
        unsigned int(32) sample_count;
        unsigned int(8) pixel_shift;
        bit(1) sign_pixel_shift;
    }
}
```

To this end, a sample entry for boundary modification may be defined (e.g. 'bomo') that defines the sample values as signal shifts in pixel translation. In that case, the sample value of the type 'bomo' may comprise the same parameters as in described with reference to the BoundaryShiftToSampleBox described above:

```
        unsigned int(8) pixel_shift;
        bit(1) sign_pixel_shift;
```

In a further embodiment, modification of the packing of the pixel regions and/or reordering and/or rotation of the pixel regions associated with a projection model may be signalled to a processor in the media playout apparatus.

The information of the projection and region-wise packing of a certain projection may be stored in a metadata track that is linked to the video track in a ISOBMFF container for the number of pixel regions under consideration.

In an embodiment, in order to describe a boundary modification of a projected video frame, a description of format of the projected video frame may be provided to the processor of the video renderer. In an embodiment, the description of the format of the projected video frame may include at least one of: information about the pixel size of a projected video frame, a coordinate system for determining a position pixels or one or more pixel regions in the projected video frame, pixel region identifiers for identifying pixel regions in the projected video frames, position information associated with the position of the pixel regions in a projected video frame and, optionally, information about the size and/or shape of the one or more pixel regions in the projected video frame.

For example, the description of the format of the projected video frame for a cube projection comprising a predetermined number of pixel regions may include parameters area_top_left_x and area_top_left_y for indicating the horizontal and vertical coordinate of the top-left corner of the rectangular area of a projected video frame in which the pixel regions are arranged according to a predetermined packing arrangement. Further, the parameters area_width and area_height may indicate respectively the width and height of the specific area on the geometry surface. Further, the cube_face_rotation parameter may indicate the amount of rotation of this cube face region, in degrees. The region may be rotated by +/−180 degrees, or any other value.

```
unsigned int(16) center_pitch_offset;
unsigned int(16) center_yaw_offset;
unsigned int(8) num_of_regions;
for(i=0; i < num_of_regions; i++) {
unsigned int(16) region_id;
        unsigned int(16) region_top_left_x;
    unsigned int(16) region_top_left_y;
    unsigned int(16) region_width;
    unsigned int(16) region_height;
        } else if (geometry_type == 4 && num_surface == 1) {
            unsigned int(16) cube_surface_id;
            unsigned int(16) area_top_left_x;
            unsigned int(16) area_top_left_y;
            unsigned int(16) area_width;
            unsigned int(16) area_height;
            signed int(16) cube_face_rotation;
        }
    }
}
```

In further embodiments, the boundary modification information, e.g. the rotation vectors of the sphere, a shift in the pixel translation and/or a modification of the packing of the pixel regions and/or reordering and/or rotation of the pixel regions, may be signalled to a decoder apparatus in the media playout apparatus as a SEI message in a coded video bitstream (e.g. a bitstream coded on the basis of a state of the art codec such as H.264, HEVC, VP9, etc.).

In particular, the encoded spherical video data may be stored in an ISOBMFF type of file inside a video track and the boundary modification information associated with the encoded spherical video data may be signalled in one or more SEI messages in the bitstream. The bitstream comprises encoded video data of the modified video frames. Hence, when the bitstream is received by the media playout device, a parser may extract the information in the SEI message from the bitstream and provide the boundary modification information to a data processor, which uses this information in order to reverse the shift, and/or rotation operations that were applied to pixels in the projected video frames before encoding.

For example, in an embodiment, the modification information may include a rotation vector of the sphere which may be signalled in a SEI message to a processor in a media playout apparatus. The horizontal shift may represent the rotation vector to be applied to the decoded spherical video data to recompose the original pixel arrangement in the frame; or, it may represent the rotation vector that was applied to the spherical video data before encoding. Such SEI message may have the following format:

| rot_vec(payloadSize ) { | Descriptor |
|---|---|
| rotation_yaw; | u(8) |
| sign_rotation_yaw; | f(1) |
| rotation_pitch; | u(8) |
| sign_rotation_pitch; | f(1) |
| rotation_roll; | u(8) |
| sign_rotation_roll; | f(1) |
| } | |

Similarly, in another embodiment, the modification information may include information about a pixel_shift associated with an ERP projection may be sent in a SEI message to a processor in a media playout apparatus. The horizontal shift may represent the shift to be applied to the decoded image to recompose the original pixel arrangement in the frame; or, it may represent the horizontal shift that was applied to the pixel arrangement before encoding. Such SEI message may have the following format:

| pixel_shift(payloadSize ) { | Descriptor |
|---|---|
| pixel_shift | u(8) |
| sign_pixel_shift | f(1) |
| } | |

In a further embodiment, the modification information may include information about the modification of the packing of the pixel regions and/or reordering and/or rotation of one or more pixel regions in projected video frames may be sent in a SEI message to a processor in the media playout apparatus. A SEI message comprising modification of a reordering and/or rotation of a pixel region of a cube projection may have the following format:

| cubeface_mod(payloadSize ) { | Descriptor |
|---|---|
| cube_surface_id | u(16) |
| area_top_left_x | u(16) |
| area_top_left_y | u(16) |
| area_width | u(16) |
| area_height | u(16) |
| cube_face_rotation | s(16) |
| } | |

Here, the parameter cube_surface_id may be an identifier for identifying one of the six pixel regions associated with a cube projection. The pixel region may have a coordinate, e.g. area_top_left_x and area_top_right_y defining the coordinate of the top left corner of the rectangular pixel region in a video frame, and one or more parameters for defining the size of the pixel region. Optionally, the SEI message may comprise a rotation parameter for signaling a rotation of the pixel region (e.g. by an integer number of ±90 degrees).

Different transport protocols may be used to transmit a bitstream including encoded projected spherical video data to a client device. For example, in an embodiment, an HTTP adaptive streaming (HAS) protocol such as MPEG DASH (ISO/IEC 23009) may be used for delivering the encoded spherical video data to a media playout device. In that case, the sequence of projected video frames representing the spherical content may be temporality divided in temporal segments (sometimes also referred to as chunks). Typically, a segment may comprise 2-10 seconds of content. Such temporal segments may be stored as a media files on a server. A HAS client apparatus in the media playout device may regularly or periodically request segments and sequentially process the media data in the segments in order to supply the media data as a bitstream to the input of a decoder apparatus. When using an HAS streaming protocol such as MPEG-DASH, the client device may use a so-called manifest file (in MPEG DASH referred to as a Media Presentation Description, MPD) for retrieving content.

A manifest file may define one or more segment identifiers for identifying segments, each segment comprising encoded spherical content as described with reference to the figures of this application. The manifest file may further comprising information, metadata associated with the spherical content, for the client apparatus and/or a data processor of the rendering engine in the media playout device.

Since the embodiments in this application use shift and/or rotation operations for changing the region boundaries in projected video frames, a processor in a media playback apparatus has to reverse these operations in order to properly render the content. Thus, the HAS client apparatus should only select such content if the rendering engine in the media playback apparatus is capable of parsing and applying the operations signalled in SEI messages and metadata in the ISOBMFF containers as described in the above embodiments.

Therefore, the presence of such metadata in the media data sent to the HAS client apparatus in the media playback apparatus is signalled in the MPD such that only a HAS client apparatus that is capable of handling such metadata can select the content.

An example of an MPD is provided hereunder wherein the MPD defines a certain Representation of spherical video data and a segment identifier, in this case an URL full_sphere_erp.mp4 for identifying a segment comprising part of the spherical video data.

In an embodiment, the MPD may comprise a parameter for signalling the HAS client apparatus about the projection model that is used for the spherical video data the Representation refers to. In particular, the MPD may comprise an EssentialProperty descriptor with the @schemeIdUri attribute "urn:mpeg:mpegB:cicp:VRProjection" indicating the projection format associated with the spherical video data. An associated @value attribute may be used indicating the projection type, e.g. value="0" may indicate that the projection is an equirectangular projection and value="1" may indicate that the projection is a cube projection.

may be configured to transform the decoded projected or packed video frame into spherical video data (step 734), which can be rendered by a rendering engine in the media playout apparatus (step 738).

The post-processor may be configured to receive decoded spherical video data from the decoder module and use the boundary modification information in order to undo the boundary modification (step 736) that was applied before rendering the video data. Depending on the type of projection that was used to project the spherical video data into a video frame and depending on at what stage the boundary

```
<?xml version="1.0" encoding="UTF-8"?>
<MPD
    xmlns="urn:mpeg:dash:schema:mpd:2011"
    type="static"
    mediaPresentationDuration="PT10S"
    minBufferTime="PT1S"
    profiles="urn:mpeg:dash:profile:isoff-on-demand:2011">
    <Period>
        <!—Low Resolution video -->
        <AdaptationSet segmentAlignment="true" subsegmentAlignment="true" subsegmentStartsWithSAP="1">
            <Representation mimeType="video/mp4" codecs="avc1.42c01e" width="3960" height="2160" bandwidth="30000000" startWithSAP="1">
                <!— 0 means equirectangular (ERP) -->
                <EssentialProperty schemeIdUri="urn:mpeg:mpegB:cicp:VRProjection" value="0 "/>
                <EssentialProperty schemeIdUri="urn:mpeg:omaf:VRBoundaryProjectionOp" value="rot_vec, pixel_shift"/>
                <BaseURL> full_sphere_erp.mp4</BaseURL>
                <SegmentBase indexRangeExact="true" indexRange="837-988"/>
            </Representation>
        </AdaptationSet>
    </Period>
</MPD>
```

The MPD may further comprise one or more parameters for signalling the type of region boundary operations that need to be applied for rendering of the content. In particular, the MPD may comprise an EssentialProperty descriptor with the @schemeIdUri attribute "urn:mpeg:omaf:VRBoundary-ProjectionOp" indicating that the parent Representation contains region boundaries operations that needs to be applied to the encoded video data for proper rendering the content. Ignoring these instructions may lead to a poor quality of experience.

In an embodiment, the @value attribute may be a (comma-separated) list of operation names of the pixel shift and/or rotation operations, e.g. rotation vector (rot_vec) and pixel shift, as describes in the above with reference to various embodiments. Alternatively, the list may be given with integer code referring to one or more predetermined operations. The HAS client apparatus may verify if the rendering engine is capable of executing the region boundaries operations as signalled in the MPD before selecting the associated video representation.

FIG. 7B depicts flow diagram of processing spherical video data by a media playout device wherein the spherical video data are subjected to a boundary modification process as described with reference to FIG. 7A. As shown in this figure, a processor, a parser, of a media playout apparatus may receive a data container comprising encoded spherical video data and extract the encoded spherical video data and the boundary modification information from the data container (step 722). The parser may transmit the encoded spherical video data to a decoder module for decoding the spherical video data into projected or mapped video frames (step 726). Further, the parser may transmit the boundary modification information to a post-processor 740, which modification was applied (see e.g. FIG. 11), the post-processing steps may include inverse packing, mapping and/or projection steps (steps 728-732) so that the boundary modification can be removed before rendering.

Figure 13:
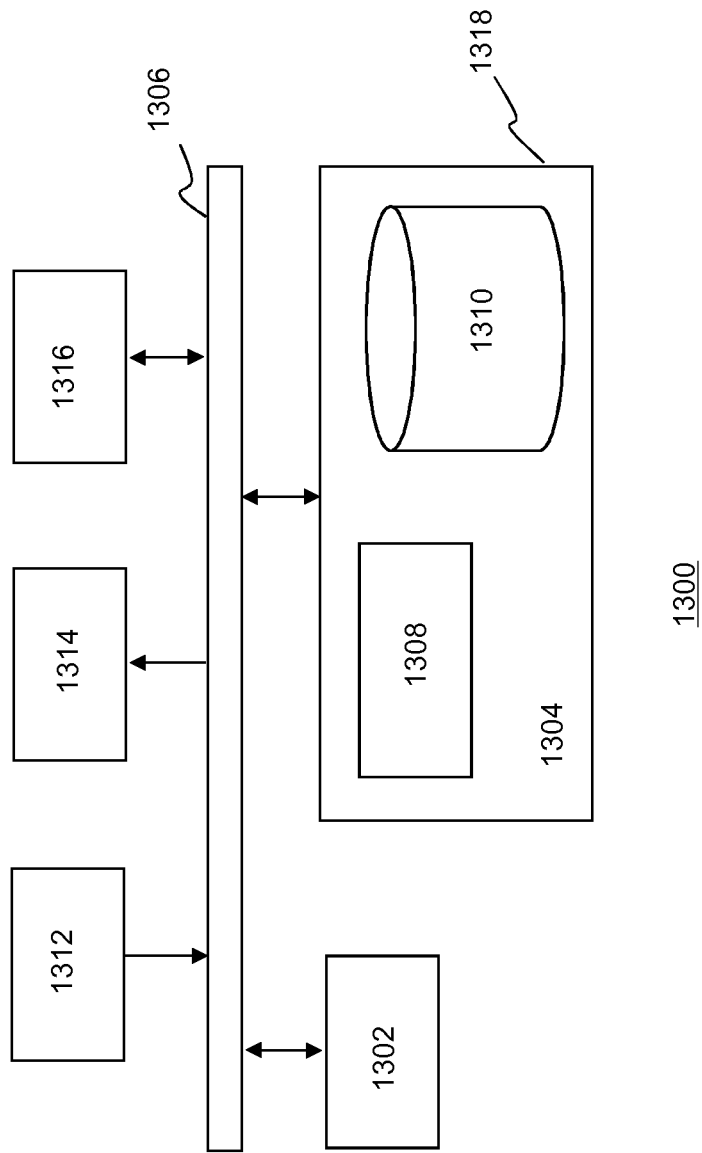
FIG. 13 depicts a block diagram illustrating an exemplary data processing system that may be used with embodiments described in this disclosure.

FIG. 13 is a block diagram illustrating exemplary data processing systems, e.g. the described in this disclosure. Data processing system 1300 may include at least one processor 1302 coupled to memory elements 1304 through a system bus 1306. As such, the data processing system may store program code within memory elements 1304. Further, processor 1302 may execute the program code accessed from memory elements 1304 via system bus 1306. In one aspect, data processing system may be implemented as a computer that is suitable for storing and/or executing program code. It should be appreciated, however, that data processing system 1300 may be implemented in the form of any system including a processor and memory that is capable of performing the functions described within this specification.

Memory elements 1304 may include one or more physical memory devices such as, for example, local memory 1308 and one or more bulk storage devices 1310. Local memory may refer to random access memory or other non-persistent memory device(s) generally used during actual execution of the program code. A bulk storage device may be implemented as a hard drive or other persistent data storage device. The processing system 1300 may also include one or more cache memories (not shown) that provide temporary storage of at least some program code in order to reduce the number of times program code must be retrieved from bulk storage device 1310 during execution.

Input/output (I/O) devices depicted as input device 1312 and output device 1314 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 1316 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1350.

As pictured in FIG. 13, memory elements 1304 may store an application 1318. It should be appreciated that data processing system 1300 may further execute an operating system (not shown) that can facilitate execution of the application. Application, being implemented in the form of executable program code, can be executed by data processing system 1300, e.g., by processor 1302. Responsive to executing application, data processing system may be configured to perform one or more operations to be described herein in further detail.

In one aspect, for example, data processing system 1300 may represent a client data processing system, e.g. In that case, application 1318 may represent a client application that, when executed, configures data processing system 1300 to perform the various functions described herein with reference to a "client". Examples of a client can include, but are not limited to, a personal computer, a portable computer, a mobile phone, or the like.

In another aspect, data processing system may represent a server. For example, data processing system may represent an (HTTP) server in which case application 1318, when executed, may configure data processing system to perform (HTTP) server operations. In another aspect, data processing system may represent a module, unit or function as referred to in this specification.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of processing spherical video data, the method comprising:
   a data processor processing a projected video frame for input to an encoding process, the projected video frame including one or more pixel regions, the one or more pixel regions representing pixels of spherical video data projected onto one or more 2D projection surfaces of a projection model, the processing including:
   generating a plurality of different modified projected video frames on the basis of the projected video frame, the generating including, for each of the plurality of different modified projected video frames, applying different one or more pixel region shift and/or pixel region rotation operations to one or more pixels regions of the projected video frame;
   applying an image analysis algorithm to each one of the plurality of modified projected video frames, the image analysis algorithm determining an image analysis parameter for each modified projected video frame, the image analysis parameter being at least one of predictive of a level of encoding efficiency associated with encoding a modified projected video frame, or indicative of an image quality of a modified projected video frame;
   selecting from the plurality, for input to the encoding process, a modified projected video frame that is at least one of associated with a particular image analysis parameter being predictive of the highest level of encoding efficiency, or associated with a particular image analysis parameter being indicative of the highest image quality, the selected modified projected video frame being associated with a selected one or more pixel region shift and/or pixel region rotation operations; and
   determining rendering information for a data processor of a video rendering apparatus, the rendering information including information for reversing the selected one or more pixel shift and/or pixel rotation operations.

2. The method according to claim 1, wherein boundaries of the one or more pixel regions define one or more region boundaries in a projected video frame, the image analysis algorithm further analysing pixels located at one or more region boundaries of the modified projected image frames or located in one or more predetermined areas around the one or more region boundaries of the modified projected image frames.

3. The method according to claim 1, wherein the image analysis algorithm further determines at least one of: (i) the presence of one or more discontinuities in one or more objects at one or more region boundaries,
   (ii) one or more moving objects in a projected video frame and if the one or more objects cross or are going to cross one or more region boundaries of the projected video frame,
   or one or more areas of high saliency in a projected video frame and if the one or more areas of high saliency cross one or more region boundaries.

4. The method according to claim 1, wherein the image analysis algorithm further determines one or more of areas in a projected video frame on a basis of at least one of: an entropy analysis, a saliency analysis, a colour shift analysis, a motion magnitude and/or a motion direction analysis, an object analysis, a boundary analysis, or an edge detection analysis.

5. The method according to claim 1, wherein at least one of two conditions is satisfied, the two conditions being: (i) the pixel region shift represents a rotation of the spherical video data or (ii) the shape of the one or more pixel regions in a projected video frame match the shape of the one or more 2D projection surfaces of the projection model.

6. The method according to claim 1, wherein the pixel region shift and/or pixel region rotation operations include a pixel operation, the pixel operation being at least one of:
  shifting pixels in one or more pixel regions of the projected video frame from a first pixel position to a second pixel position,
  rearranging positions of pixel regions in the projected video frame,
  exchanging pixels of a first pixel region at a first position in a projected video frame with the pixels of a second pixel region at a second position in the projected video frame,
  or rotating the pixels of one or more pixel regions in the projected video frame.

7. The method according to claim 1, further comprising: providing the selected modified projected video frame to the input of the encoding process.

8. The method according to claim 7, further comprising: the encoder process encoding the video data of the selected modified projected video frame and storing the encoded video data.

9. The method according claim 8, further comprising a storing at least one of (i) only the rendering information, wherein storing only the rendering information comprises storing the rendering information in a box of an ISOBMFF type data container, or (ii) the encoded video data and the rendering information, wherein storing the encoded video data and the rendering information comprises storing the encoded video data as a video track in the data container and storing the rendering information as a metadata track in the data container wherein the metadata track is linked to the video data track.

10. The method according to claim 8, further comprising: the encoder process storing the rendering information in one or more data containers, the one or more data containers being (i) one or more ISOBMFF type data containers, or (ii) one or more segment files for transmitting the encoded video data on the basis of a HTTP adaptive streaming (HAS) protocol to a HAS client apparatus.

11. The method according to claim 1, wherein the rendering information is at least one of:
  one or more pixel region identifiers for identifying one or more pixel regions in a modified projected video frame, or
  location information of one or more pixel regions, the location information signaling the data processor the position of one or more pixel regions in a modified projected video frame.

12. The method according to claim 1, wherein the video data of the one or more modified projected video frames are encoded by the encoding process into a bitstream, and wherein during the encoding the rendering information is inserted as one or more supplemental enhancement information (SEI) messages in the bitstream.

13. The method according to claim 1, further comprising:
  generating a sequence of modified video frames by applying the selected one or more pixel region shift and/or pixel region rotation operations to a sequence of projected video frames; and
  providing the generated sequence of modified projected video frames to the input of the encoding process.

14. The method according to claim 13, further comprising:
  the encoder process encoding the video data of one or more of the modified projected video frames and storing the encoded video data.

15. The method according to claim 14, further comprising:
  the encoder process storing the rendering information in one or more data containers, the one or more data containers being (i) one or more ISOBMFF type data containers, or (ii) one or more segment files for transmitting the encoded video data on the basis of a HTTP adaptive streaming (HAS) protocol to a HAS client apparatus.

16. The method according claim 14, further comprising a storing at least one of (i) only the rendering information, wherein storing only the rendering information comprises storing the rendering information in a box of an ISOBMFF type data container, or (ii) the encoded video data and the rendering information, wherein storing the encoded video data and the rendering information comprises storing the encoded video data as a video track in the data container and storing the rendering information as a metadata track in the data container wherein the metadata track is linked to the video data track.

17. A method of processing spherical video data, the method comprising:
  a data processor processing modified projected video frames, a modified projected video frame including one or more pixel regions, the one or more pixel regions representing pixels of spherical video data projected onto one or more 2D projection surfaces of a projection model, the modified projected video frame being generated by applying one or more pixel shifts and/or pixel rotation operations to pixels of one or more pixel regions of a projected video frame prior to encoding, wherein the processing includes:
  the data processor receiving one or more modified projected video frames from a decoding apparatus;
  the data processor receiving rendering information associated with the one or more received modified projected video frames, the rendering information including information for reversing one or more pixel region shift and/or pixel region rotation operations that were applied to pixels of one or more pixel regions of projected video frames before encoding; and
  the data processor using the rendering information on the modified projected video frames to reverse the one or more pixel region shift and/or pixel region rotation operations that were applied to pixels of one or more pixel regions of the projected video frames before encoding.

18. A data processing apparatus for a video encoding apparatus, the data processing apparatus comprising:
  a processor and memory storing instructions that, when executed by the processor, cause the data processing apparatus to carry out operations including:
  processing a projected video frame for input to an encoding process, the projected video frame including one or more pixel regions, the one or more pixel regions representing pixels of spherical video data projected onto one or more 2D projection surfaces of a projection model, wherein the processing includes:
    generating a plurality of different modified projected video frames on the basis of the projected video frame, the generating including, for each of the plurality of different modified projected video frames, applying different one or more pixel region shift and/or pixel region rotation operations to one or more pixels regions of the projected video frame;
    applying an image analysis algorithm to each one of the plurality of modified projected video frames, the image analysis algorithm determining an image analysis parameter for each modified projected video frame, the image analysis parameter being at least one of predictive of a level of encoding efficiency associated with encoding a modified projected video frame, or indicative of an image quality of a modified projected video frame;
    selecting from the plurality, for input to the encoding process, a modified projected video frame that is at least one of associated with a particular image analysis parameter being predictive of the highest level of encoding efficiency, or associated with a particular image analysis parameter being indicative of the highest image quality, the selected modified projected video frame being associated with a selected one or more pixel region shift and/or pixel region rotation operations; and
    determining rendering information for a data processor of a video rendering apparatus, the rendering information including information for reversing the selected one or more pixel shift and/or pixel rotation operations.

19. The data processing apparatus of claim 18, wherein the memory further stores additional instructions that, when executed by the processor, cause the data processing apparatus to implement a manifest file, the manifest file comprising:
    one or more segment identifiers for identifying one or more segments, each segment comprising a sequence of encoded modified projected video frames; a modified projected video frame including one or more pixel regions, the one or more pixel regions representing pixels of spherical video data projected onto one or more 2D projection surfaces of a projection model, and
    capabilities information associated with at least part of the one or more segment identifiers, the capabilities information signaling the client apparatus that before encoding pixel region shift and/or pixel region rotation operations were applied to the pixels of the projected video frames in the one or more segments.

20. The data processing apparatus of claim 19, wherein the manifest file further comprises one or more parameters for at least one of:
    signalling the client apparatus about a projection model that is used for the projected video frames,
    or signalling the client apparatus about at least one of (i) a type of pixel region shift and/or pixel region rotation operations that were applied to the pixels in the projected video frames before encoding, or (ii) the type of pixel region shift and/or pixel region rotation operations that need to be applied to the modified projected video frames after decoding in order to reverse the shift and/or rotation operations that were applied to the pixels in the projected video frames before encoding.

21. A data processing apparatus for a video rendering apparatus, the processing apparatus comprising:
    a processor and memory storing instructions that, when executed by the processor, cause the data processing apparatus to carry out operations including:
    processing modified projected video frames, a modified projected video frame including one or more pixel regions, the one or more pixel regions representing pixels of spherical video data projected onto one or more 2D projection surfaces of a projection model, the modified project video frames being generated by applying one or more pixel region shift and/or pixel region rotation operations to pixels of one or more pixel regions of one or more projected video frames before encoding, wherein the processing includes:
        receiving the one or more modified projected video frames from a decoding apparatus;
        receiving rendering information associated with the one or more received modified projected video frames, the rendering information including information for reversing one or more pixel region shift and/or pixel region rotation operations that were applied to pixels of one or more pixel regions of the one or more projected video frames before encoding; and
        using the rendering information on the received modified projected video frames to reverse the one or more pixel region shift and/or pixel region rotation operations that were applied to pixels of one or more pixel regions of the one or more projected video frames before encoding.

22. The data processing apparatus according to claim 21, wherein the rendering information comprises at least one of: one or more pixel region identifiers for identifying one or more pixel regions in a projected video frame; location information of the one or more pixel regions identified by said one or more pixel region identifiers, the location information signaling the data processing apparatus the position of the one or more pixel regions in the projected video frame.

23. The data processing apparatus according to claim 22, wherein a cube projection model is used to generate the projected video frames and the one or more pixel regions represent faces of a cube.

24. The data processing apparatus according to claim 23, wherein the rendering information comprises at least one cube face rotation parameter for signaling a rotation of at least one of the one or more pixel regions.

25. The data processing apparatus according to claim 24, wherein the processing apparatus is comprised in the video rendering apparatus, wherein the video rendering apparatus further comprises a decoder apparatus,
    wherein the video rendering apparatus is configured to receive the rendering information as part of one or more supplemental enhancement information (SEI) messages in a bitstream, the bitstream further comprising the modified project video frames,
    and wherein the video rendering apparatus further comprises a parser configured to parse the one or more SEI messages.

26. The data processing apparatus according to claim 13, wherein the processing apparatus is comprised in the video rendering apparatus, wherein the video rendering apparatus further comprises a decoder apparatus,
    wherein the video rendering apparatus is configured to receive the rendering information as part of one or more supplemental enhancement information (SEI)

messages in a bitstream, the bitstream further comprising the modified project video frames, and wherein the video rendering apparatus further comprises a parser configured to parse the one or more SEI messages.

27. The data processing apparatus according to claim 21, wherein the data processing apparatus is comprised in the video rendering apparatus, wherein the video rendering apparatus further comprises a decoder apparatus, wherein the video rendering apparatus is configured to receive the rendering information as part of one or more supplemental enhancement information (SEI) messages in a bitstream, the bitstream further comprising the modified project video frames, and wherein the video rendering apparatus further comprises a parser configured to parse the one or more SEI messages.

28. The data processing apparatus according to claim 22, wherein the processing apparatus is comprised in the video rendering apparatus, wherein the video rendering apparatus further comprises a decoder apparatus, wherein the video rendering apparatus is configured to receive the rendering information as part of one or more supplemental enhancement information (SEI) messages in a bitstream, the bitstream further comprising the modified project video frames, and wherein the video rendering apparatus further comprises a parser configured to parse the one or more SEI messages.

29. A non-transitory computer readable medium having instructions stored thereon for processing spherical video data, wherein the instructions, when executed by a data processor, cause the data processor to carry out operations including:

processing a projected video frame for input to an encoding process, the projected video frame including one or more pixel regions, the one or more pixel regions representing pixels of spherical video data projected onto one or more 2D projection surfaces of a projection model, wherein the processing comprises:

generating a plurality of different modified projected video frames on the basis of the projected video frame, the generating including, for each of the plurality of different modified projected video frames, applying different one or more pixel region shift and/or pixel region rotation operations to one or more pixels regions of the projected video frame;

applying an image analysis algorithm to each one of the plurality of modified projected video frames, the image analysis algorithm determining an image analysis parameter for each modified projected video frame, the image analysis parameter being at least one of predictive of a level of encoding efficiency associated with encoding a modified projected video frame, or indicative of an image quality of a modified projected video frame;

selecting from the plurality, for input to the encoding process, a modified projected video frame that is at least one of associated with a particular image analysis parameter being predictive of the highest level of encoding efficiency, or associated with a particular image analysis parameter being indicative of the highest image quality, the selected modified projected video frame being associated with a selected one or more pixel region shift and/or pixel region rotation operations; and determining rendering information for a data processor of a video rendering apparatus, the rendering information including information for reversing the selected one or more pixel shift and/or pixel rotation operations.

* * * * *